(12) United States Patent
Otsuki

(10) Patent No.: US 6,416,162 B1
(45) Date of Patent: Jul. 9, 2002

(54) COLOR PRINTING USING A VERTICAL NOZZLE ARRAY HEAD

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/461,307

(22) Filed: Dec. 15, 1999

(30) Foreign Application Priority Data

Dec. 24, 1998 (JP) .............................. 10-366273

(51) Int. Cl.⁷ .............................. B41J 2/145; B41J 2/15; B41J 29/38
(52) U.S. Cl. .................. 347/41; 347/9; 347/12
(58) Field of Search ................ 347/41, 9, 12, 347/43

(56) References Cited

U.S. PATENT DOCUMENTS

| | | | | |
|---|---|---|---|---|
| 4,198,642 A | | 4/1980 | Gamblin .................. | 347/41 |
| 5,684,517 A | * | 11/1997 | Clemente et al. ........... | 347/43 |
| 5,927,871 A | | 7/1999 | Nakata .................... | 400/61 |
| 6,017,112 A | * | 1/2000 | Anderson et al. ........... | 347/40 |
| 6,068,366 A | * | 5/2000 | Bolash et al. .............. | 347/43 |

FOREIGN PATENT DOCUMENTS

| | | |
|---|---|---|
| JP | 53-2040 | 1/1978 |
| JP | 56-8266 | 1/1981 |
| JP | 3-207665 | 9/1991 |
| JP | 4-19030 | 3/1992 |
| JP | 5-246048 | 9/1993 |
| JP | 7-132619 | 5/1995 |

\* cited by examiner

*Primary Examiner*—Thinh Nguyen
(74) *Attorney, Agent, or Firm*—Oblon, Spivak, McClelland, Maier & Neustadt, P.C.

(57) ABSTRACT

A printer has a print head including a plurality of dot formation element groups for forming dots of different inks where the plurality of dot formation element groups are arrayed in a prescribed order in the sub-scanning direction. The dot formation elements of each group are arranged at an identical pitch k in the sub-scanning direction. The pitch k is set at an integer multiple value that is at least two times a pitch of dots formed on the print medium in the sub-scanning direction. Dot forming is executed while using a mutually equal number N of dot formation elements of each group arrayed at the pitch k where N is an integer of at least 2. The N dot formation elements of each group are selected so that a spacing between the groups of the N dot formation elements is M times the pitch k where M is an integer of at least 2.

16 Claims, 26 Drawing Sheets

Fig. 4 (A)   CONCEPT OF SUB-SCAN FEED(s=1)

Fig. 4 (B)   PARAMETERS

NOZZLE PITCH k : 3 [dot]
NUMBER OF USED NOZZLES N : 4
NUMBER OF SCAN REPEATS s : 1
NUMBER OF EFFECTIVE NOZZLES Neff : 4

| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F=(ΣL)%k | 0 | 1 | 2 | 0 |

Fig. 5 (A)  CONCEPT OF SUB-SCAN FEED(s=2)

Fig. 5 (B)  PARAMETERS

NOZZLE PITCH k : 3 [dot]
NUMBER OF USED NOZZLES N : 4
NUMBER OF SCAN REPEATS s : 2
NUMBER OF EFFECTIVE NOZZLES Neff : 2

| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| ΣL | 0 | 2 | 4 | 6 | 8 | 10 | 12 |
| F=(ΣL)%k | 0 | 2 | 1 | 0 | 2 | 1 | 0 |

Fig. 6

SCAN PARAMETERS IN FIRST EMBODIMENT

Nozzle pitch : k = 6 [dots]
Number of scan repeats : s = 1
Number of working nozzles : N = 13
Number of effective nozzles : Neff = 13

| PASS No. | 1 | 2 | 3 | 4 | 5 | 6 | 7 |
|---|---|---|---|---|---|---|---|
| SUB-SCAN No | 0 | 1 | 2 | 3 | 4 | 5 | 6 |
| FEED L [dots] | 0 | 13 | 13 | 13 | 13 | 13 | 13 |
| $\Sigma L$ | 0 | 13 | 26 | 39 | 52 | 65 | 78 |
| $F=(\Sigma L)\%k$ | 0 | 1 | 2 | 3 | 4 | 5 | 0 |

WORKING NOZZLES IN FIRST EMBODIMENT

Fig. 8

FIRST EMBODIMENT

WORKING NOZZLES IN FIRST COMPARATIVE EXAMPLE

Fig. 10

FIRST COMPARATIVE EXAMPLE

| RASTER LINE No. | PASS No. 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| 1 | C11 | | | | | | M11 | | | | | | Y11 | | | | | | | |
| 2 | | C9 | | | | | | M9 | | | | | | Y9 | | | | | | |
| 3 | | | C7 | | | | | M7 | | | | | | | Y7 | | | | | |
| 4 | | | | C5 | | | | | M5 | | | | | | | Y5 | | | | |
| 5 | | | | | C3 | | | | | M3 | | | | | | | Y3 | | | |
| 6 | | | | | | C1 | | | | | M1 | | | | | | | Y1 | Cmis, Mmis, Ymis |
| 7 | C12 | | | | | | M12 | | | | | | Y12 | | | | | | | |
| 8 | | C10 | | | | | M10 | | | | | | Y10 | | | | | | | |
| 9 | | | C8 | | | | | M8 | | | | | | Y8 | | | | | | |
| 10 | | | | C6 | | | | M6 | | | | | | | Y6 | | | | | |
| 11 | | | | | C4 | | | | | M4 | | | | | | Y4 | | | | |
| 12 | | | | | | C2 | | | | | M2 | | | | | | | Y2 | Cmis, Mmis, Ymis |
| 13 | C13 | | | | | | M13 | | | | | | Y13 | | | | | | | |
| 14 | | C11 | | | | | M11 | | | | | | Y11 | | | | | | | |
| 15 | | | C9 | | | | | M9 | | | | | | Y9 | | | | | | |
| 16 | | | | C7 | | | | M7 | | | | | | | Y7 | | | | | |
| 17 | | | | | C5 | | | | M5 | | | | | | | Y5 | | | | |
| 18 | | | | | | C3 | | | | M3 | | | | | | | Y3 | | | |
| 19 | | | | | | | C1 | | | | M1 | | | | | | | Y1 | | |
| 20 | C12 | | | | | | M12 | | | | | | Y12 | | | | | | | |
| 21 | | C10 | | | | | M10 | | | | | | Y10 | | | | | | | |
| 22 | | | C8 | | | | | M8 | | | | | | Y8 | | | | | | |
| 23 | | | | C6 | | | | M6 | | | | | | | Y6 | | | | | |
| 24 | | | | | C4 | | | | M4 | | | | | | | Y4 | | | | |
| 25 | | | | | | C2 | | | | M2 | | | | | | | Y2 | | | |
| 26 | C13 | | | | | | M13 | | | | | | Y13 | | | | | | | |
| 27 | | C11 | | | | | M11 | | | | | | Y11 | | | | | | | |
| 28 | | | C9 | | | | | M9 | | | | | | Y9 | | | | | | |
| 29 | | | | C7 | | | | M7 | | | | | | | Y7 | | | | | |
| 30 | | | | | C5 | | | | M5 | | | | | | | Y5 | | | | |
| 31 | | | | | | C3 | | | | M3 | | | | | | | Y3 | | | |
| 32 | | | | | | | C1 | | | | M1 | | | | | | | Y1 | | |
| 33 | | | | | | C12 | | M12 | | | | | Y12 | | | | | | | |
| 34 | | | | | C10 | | | M10 | | | | | Y10 | | | | | | | |
| 35 | | | | C8 | | | | M8 | | | | | | Y8 | | | | | | |
| 36 | | | | C6 | | | | M6 | | | | | | | Y6 | | | | | |
| 37 | | | | | C4 | | | | M4 | | | | | | | Y4 | | | | |
| 38 | | | | | | C2 | | | | M2 | | | | | | | Y2 | | | |
| 39 | | | | C13 | | | M13 | | | | | Y13 | | | | | | | | |
| 40 | | | | | C11 | | | M11 | | | | | Y11 | | | | | | | |

EQUIVALENT NOZZLE POSITIONING

Fig. 12

SCAN PARAMETERS IN SECOND EMBODIMENT

Nozzle pitch : k = 6 [dots]
Number of scan repeats : s = 1
Number of working nozzles : N = 15
Number of effective nozzles : Neff = 15

| PASS No. | 1 | 2 | 3 | 4 | 5 | 6 | 7 |
|---|---|---|---|---|---|---|---|
| SUB-SCAN No | 0 | 1 | 2 | 3 | 4 | 5 | 6 |
| FEED L [dots] | 0 | 14 | 15 | 16 | 16 | 15 | 14 |
| $\Sigma L$ | 0 | 14 | 29 | 45 | 61 | 76 | 90 |
| F=($\Sigma L$)%k | 0 | 2 | 5 | 3 | 1 | 4 | 0 |

WORKING NOZZLES IN SECOND EMBODIMENT

Fig. 14

SECOND EMBODIMENT

RASTER LINE No. / PASS No.

| Line | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| 1 | | | C8 | | | | | | M9 | | | | | | Y10 | | | | | |
| 2 | C13 | | | | | | M14 | | | | | | Y15 | | | | | | | Cmis, Mmis, Ymis |
| 3 | | | | C3 | | | | | | M4 | | | | | | Y5 | | | | |
| 4 | | C11 | | | | | | M12 | | | | | Y13 | | | | | | | |
| 5 | | | C6 | | | | M7 | | | | | | | Y8 | | | | | | |
| 6 | | | | C1 | | | | | M2 | | | | | | | | Y3 | | | |
| 7 | | C9 | | | | | M10 | | | | | Y11 | | | | | | | | Ymis |
| 8 | C14 | | | | M15 | | | | | | | | × | | | | | Y1 | | Cmis, Mmis |
| 9 | | | C4 | | | | | M5 | | | | | | Y6 | | | | | | |
| 10 | | C12 | | | | M13 | | | | | Y14 | | | | | | | | | |
| 11 | | | C7 | | | | M8 | | | | | | Y9 | | | | | | | |
| 12 | | | | C2 | | | | | M3 | | | | | | Y4 | | | | | |
| 13 | | C10 | | | | M11 | | | | | Y12 | | | | | | | | | Mmis, Ymis |
| 14 | C15 | | | | × | | | | M1 | | | | | | | Y2 | | | | |
| 15 | | | C5 | | | | M6 | | | | | Y7 | | | | | | | | |
| 16 | C13 | | | | M14 | | | | | Y15 | | | | | | | | | | |
| 17 | | C8 | | | | M9 | | | | | Y10 | | | | | | | | | |
| 18 | | | C3 | | | | M4 | | | | | Y5 | | | | | | | | |
| 19 | C11 | | | | M12 | | | | | Y13 | | | | | | | | | | Cmis, Mmis, Ymis |
| 20 | | | | C1 | | | M2 | | | | | Y3 | | | | | | | | |
| 21 | | C6 | | | | M7 | | | | | Y8 | | | | | | | | | |
| 22 | C14 | | | | M15 | | | | | × | | | | | | Y1 | | | | |
| 23 | | C9 | | | M10 | | | | | Y11 | | | | | | | | | | |
| 24 | | | C4 | | | M5 | | | | | Y6 | | | | | | | | | |
| 25 | C12 | | | | M13 | | | | | Y14 | | | | | | Y4 | | | | |
| 26 | | | C2 | | | | M3 | | | | Y9 | | | | | | | | | |
| 27 | | C7 | | | | M8 | | | | | | | | | | | | | | |
| 28 | C15 | | | × | | | | M1 | | | | | | | Y2 | | | | | |
| 29 | | C10 | | | M11 | | | | | Y12 | | | | | | | | | | |
| 30 | | | C5 | | | M6 | | | | | Y7 | | | | | | | | | |
| 31 | C13 | | | | M14 | | | | | Y15 | | | | | | Y5 | | | | |
| 32 | | | C3 | | | M4 | | | | | Y10 | | | | | | | | | |
| 33 | | C8 | | | | M9 | | | | | | | | | Y3 | | | | | |
| 34 | | | C1 | | | M2 | | | | | Y13 | | | | | | | | | |
| 35 | | C11 | | | M12 | | | | | | Y8 | | | | | | | | | |
| 36 | | C6 | | | M7 | | | | | | | | × | | | Y1 | | | | |
| 37 | C14 | | | M15 | | | | M5 | | | | Y6 | | | | | | | | |
| 38 | | C4 | | | | M10 | | | | Y11 | | | | | | | | | | |
| 39 | | C9 | | | C2 | | | M3 | | | | Y4 | | | | | | | | |
| 40 | | | C2 | | | M3 | | | | Y4 | | | | | | | | | | |

WORKING NOZZLES IN SECOND COMPARATIVE EXAMPLE

Fig. 16

SECOND COMPARATIVE EXAMPLE

| RASTER LINE No. | Pass 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| 1 |  |  | C8 |  |  |  |  |  | M8 |  |  |  |  |  | Y8 |  |  |  |  | |
| 2 | C13 |  |  |  |  | M13 |  |  |  |  |  |  | Y13 |  |  |  |  |  |  | Cmis, Mmis, Ymis |
| 3 |  |  |  | C3 |  |  |  |  |  | M3 |  |  |  |  |  |  | Y3 |  |  | |
| 4 |  | C11 |  |  |  |  | M11 |  |  |  |  |  | Y11 |  |  |  |  |  |  | |
| 5 |  |  |  |  | C6 |  |  |  | M6 |  |  |  |  |  |  | Y6 |  |  |  | |
| 6 |  |  |  |  |  | C1 |  |  |  |  | M1 |  |  |  |  |  |  | Y1 |  | |
| 7 |  |  | C9 |  |  |  |  |  | M9 |  |  |  |  |  | Y9 |  |  |  |  | |
| 8 | C14 |  |  |  |  | M14 |  |  |  |  |  |  | Y14 |  |  |  |  |  |  | Cmis, Mmis, Ymis |
| 9 |  |  |  | C4 |  |  |  |  |  | M4 |  |  |  |  |  |  | Y4 |  |  | |
| 10 |  | C12 |  |  |  |  | M12 |  |  |  |  |  | Y12 |  |  |  |  |  |  | |
| 11 |  |  |  |  | C7 |  |  |  | M7 |  |  |  |  |  |  | Y7 |  |  |  | |
| 12 |  |  |  | C2 |  |  |  |  |  | M2 |  |  |  |  |  |  | Y2 |  |  | |
| 13 |  | C10 |  |  |  |  | M10 |  |  |  |  |  | Y10 |  |  |  |  |  |  | |
| 14 | C15 |  |  |  |  | M15 |  |  |  |  |  |  | Y15 |  |  |  |  |  |  | Cmis, Mmis, Ymis |
| 15 |  |  |  |  | C5 |  |  |  | M5 |  |  |  |  |  |  | Y5 |  |  |  | |
| 16 |  | C13 |  |  |  |  | M13 |  |  |  |  |  | Y13 |  |  |  |  |  |  | |
| 17 |  |  | C8 |  |  |  |  |  | M8 |  |  |  |  |  | Y8 |  |  |  |  | |
| 18 |  |  |  | C3 |  |  |  |  |  | M3 |  |  |  |  |  |  | Y3 |  |  | |
| 19 |  | C11 |  |  |  |  | M11 |  |  |  |  |  | Y11 |  |  |  |  |  |  | |
| 20 |  |  |  |  |  | C1 |  |  |  |  | M1 |  |  |  |  |  |  | Y1 |  | |
| 21 |  |  |  |  | C6 |  |  |  | M6 |  |  |  |  |  |  | Y6 |  |  |  | |
| 22 | C14 |  |  |  |  | M14 |  |  |  |  |  |  | Y14 |  |  |  |  |  |  | |
| 23 |  |  | C9 |  |  |  |  |  | M9 |  |  |  |  |  | Y9 |  |  |  |  | |
| 24 |  |  |  | C4 |  |  |  |  |  | M4 |  |  |  |  |  |  | Y4 |  |  | |
| 25 |  | C12 |  |  |  |  | M12 |  |  |  |  |  | Y12 |  |  |  |  |  |  | |
| 26 |  |  |  | C2 |  |  |  |  |  | M2 |  |  |  |  |  |  | Y2 |  |  | |
| 27 |  |  |  |  | C7 |  |  |  | M7 |  |  |  |  |  |  | Y7 |  |  |  | |
| 28 | C15 |  |  |  |  | M15 |  |  |  |  |  |  | Y15 |  |  |  |  |  |  | |
| 29 |  | C10 |  |  |  |  | M10 |  |  |  |  |  | Y10 |  |  |  |  |  |  | |
| 30 |  |  |  |  | C5 |  |  |  | M5 |  |  |  |  |  |  | Y5 |  |  |  | |
| 31 |  | C13 |  |  |  |  | M13 |  |  |  |  |  | Y13 |  |  |  |  |  |  | |
| 32 |  |  |  | C3 |  |  |  |  |  | M3 |  |  |  |  |  |  | Y3 |  |  | |
| 33 |  |  | C8 |  |  |  |  |  | M8 |  |  |  |  |  | Y8 |  |  |  |  | |
| 34 |  |  |  |  |  | C1 |  |  |  |  | M1 |  |  |  |  |  |  | Y1 |  | |
| 35 |  | C11 |  |  |  |  | M11 |  |  |  |  |  | Y11 |  |  |  |  |  |  | |
| 36 |  |  |  |  | C6 |  |  |  | M6 |  |  |  |  |  |  | Y6 |  |  |  | |
| 37 | C14 |  |  |  |  | M14 |  |  |  |  |  |  | Y14 |  |  |  |  |  |  | |
| 38 |  |  |  | C4 |  |  |  |  |  | M4 |  |  |  |  |  |  | Y4 |  |  | |
| 39 |  |  | C9 |  |  |  |  |  | M9 |  |  |  |  |  | Y9 |  |  |  |  | |
| 40 |  |  |  |  |  | C2 |  |  |  |  | M2 |  |  |  |  |  |  | Y2 |  | |

FIRST ACTUATOR VARIATION

SECOND ACTUATOR VARIATION

THIRD ACTUATOR VARIATION

FOURTH ACTUATOR VARIATION

FIFTH ACTUATOR VARIATION

SIXTH ACTUATOR VARIATION

SEVENTH ACTUATOR VARIATION

EIGHTH ACTUATOR VARIATION

COLOR PRINTING USING A VERTICAL NOZZLE ARRAY HEAD

BACKGROUND OF THE INVENTION

1. Field of the Invention

This invention relates to a color printing apparatus that uses a print head for forming dots of a plurality of colors.

2. Description of the Related Art

Serial scan-type printers and drum scan-type printers are dot recording devices which record dots with a print head while carrying out scans both in a main scanning direction and a sub-scanning direction. There is a technique called "interlace scheme", which is taught by U.S. Pat. No. 4,198,642 and Japanese Patent Laid-Open Gazette No. 53-2040, for improving the image quality of printers of this type, especially ink jet printers.

FIG. 25 is a diagram explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning amount [dots] or [inch];
w: Dot pitch [inch].

The number of nozzles (N) is the number of nozzles actually used to form dots. In the example of FIG. 25, N=3. The nozzle pitch (k) is the interval between the centers of the recording head nozzles expressed in units of the record image pitch (i.e., dot pitch (w)). In the example of FIG. 25, k=2. The number of scan repeats (s) is the number of main scans in which all dot positions on a main scanning line are serviced. In the example of FIG. 25, s=1, i.e., all dot positions on a main scanning line are serviced in a single main scan. When s is 2 or greater, the dots are formed intermittently in the main scanning direction. This will be explained in detail later. The nozzle density (D) is the number of nozzles per inch in the nozzle array of the print head. The sub-scanning amount (L) is the distance moved in one sub-scan. The dot pitch (w) is the pitch of the dots in the recorded image. In general, it holds that w=1/(D·k), k=1/(D·w).

The circles containing two-digit numerals in FIG. 25 indicate dot recording positions. As indicated in the legend, the numeral on the left in each circle indicates the nozzle number and the numeral on the right indicates the recording order (the number of the main scan in which it was recorded).

The interlace scheme shown in FIG. 25 is characterized by the configuration of the nozzle array of the recording head and the sub-scanning method. Specifically, in the interlace scheme, the nozzle pitch k indicating the interval between the centers of adjacent nozzles is defined as an integer at least 2, while the number of nozzles N and the nozzle pitch k are selected as integers which are relatively prime. Two integers are "relatively prime" when they do not have a common divisor other than 1. Further, sub-scanning pitch L is set at a constant value given by N/(D·k).

The interlace scheme makes irregularities in nozzle pitch and ink jetting feature to thin out over the recorded image. Because of this, it improves image quality by mitigating the effect of any irregularity that may be present in the nozzle pitch, the jetting feature and the like.

The "overlap scheme", also known as the "multi-scan scheme", taught for example by Japanese Patent Laid-Open Gazette No. 3-207665 and Japanese Patent Publication Gazette No. 4-19030 is another technique used to improve image quality in color ink jet printers.

FIG. 26 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 26, a dot is formed at every second dot position. The timing of the driving of the nozzle sets is controlled so that the each nozzle set forms dots at different positions from the other in the main scanning direction. In other words, as shown in FIG. 26, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pitch k is set at an integer at least 2, as in the interlace scheme. However, the number of nozzles N and the nozzle pitch k are not relatively prime, but the nozzle pitch k and the value N/s, which is obtained by dividing the number of nozzles N by the number of scan repeats s, are set at relatively prime integers instead.

In the overlap scheme, the dots of each main scanning line are not all recorded by the same nozzle but by multiple nozzles. Even when the nozzle characteristics (pitch, jetting feature etc.) are not completely uniform, therefore, enhanced image quality can be obtained because the characteristics of the individual nozzles is prevented from affecting the entire main scanning line.

Mechanical error arising during sub-scanning feeding tends to accumulate with repeated sub-scanning feed operations. In an interlaced scheme, there are cases in which a plurality of sub-scanning feeds is effected during printing of two adjacent raster lines. At this time, the accumulated error of the sub-scanning feed operations gives rise to some variation in the spacing between the two raster lines. Portions in which there is a large such variation show up as banding in the main scanning direction, degrading the image quality.

To reduce banding, in recent years various dot printing schemes have been proposed which include ideas relating to sub-scanning feed amounts. However, not much consideration has been given to the relationship of the location of the banding with respect to dots of different inks, that is, with respect to the location at which the accumulated feed error arises. Thus, there is overlapping of the positions at which banding of dots of different inks occurs, degrading the image quality.

SUMMARY OF THE INVENTION

Accordingly, an object of the present invention is to provide a technology for improving image quality by adjusting the relationships with the positions at which the accumulated error of sub-scanning feeds is manifested with respect to dots of different inks.

The present invention uses a print head including a plurality of dot formation element groups for forming dots of different inks where the plurality of dot formation element groups are arrayed in a prescribed order in the sub-scanning direction. The dot formation elements of each group are arranged at an identical pitch k in the sub-scanning direction. The pitch k is set at an integer multiple value that is at least two times a pitch of dots formed on the print medium in the sub-scanning direction. Dot forming is executed while using a mutually equal number N of dot formation elements of each group arrayed at the pitch k where N is an integer of at least 2. The N dot formation elements of each group are selected so that a spacing between the groups of the N dot formation elements is M times the pitch k where M is an integer of at least 2.

In accordance with this invention, since the spacing between adjacent groups is set to be M×k where M is an integer of at least 2, the positions at which the accumulated error of sub-scanning feeds is manifested with respect to the dots of the different inks do not always coincide.

The print head may be formed so that a spacing between end dot formation elements of adjacent groups is M times the pitch k where M is an integer of at least 2.

The term "end dot formation element" of each group means the endmost element of the implemented dot formation elements of each group, including working and non-working dot formation elements. Using the above type of print head makes it possible to set the spacing between adjacent groups of dot formation elements at M×k where M is an integer of at least 2, even when using close to all of the elements provided on the print head.

The integer M may be set at a value other than (N×n+1) where n is an arbitrary integer of at least 1. This makes it possible to more reliably prevent the accumulated feed errors relating to the dots of each ink from showing up at the same position.

The sub-scanning may be performed in accordance with an interlacing scheme where a plurality of sub-scan feeds are sometimes executed between two main scanning passes for forming dots on certain two adjacent main scanning lines. In this type of interlace scheme, the accumulated sub-scanning feed error between the two adjacent main scanning lines can easily become large. With such an interlace scheme, the image-improvement effect obtained by reducing banding by ensuring that the accumulated feed errors for the dots of each ink do not always coincide is even more pronounced.

Specific aspects of the invention can be applied to various types of printing apparatus, printing methods and computer program products.

These and other objects, features, aspects, and advantages of the present invention will become more apparent from the following detailed description of the preferred embodiments with the accompanying drawings.

BRIEF DESCRIPTION OF THE DRAWINGS

FIG. 6 shows the scanning parameters of a printing scheme according to a first embodiment of the invention.

FIG. 8 is an explanatory diagram of the nozzles used in the first embodiment to form the raster lines during each pass within the effective printing area.

FIG. 10 is an explanatory diagram of the nozzles used in the first comparative example to form the raster lines during each pass within the effective printing area.

FIG. 12 shows the scanning parameters of a printing scheme according to a second embodiment of the invention.

FIG. 14 is an explanatory diagram of the nozzles used in the second embodiment to form the raster lines during each pass within the effective printing area.

FIG. 16 is an explanatory diagram of the nozzles used in the second comparative example to form the raster lines during each pass within the effective printing area.

DESCRIPTION OF THE PREFERRED EMBODIMENT

A. General Configuration of the Apparatus

Figure 1:
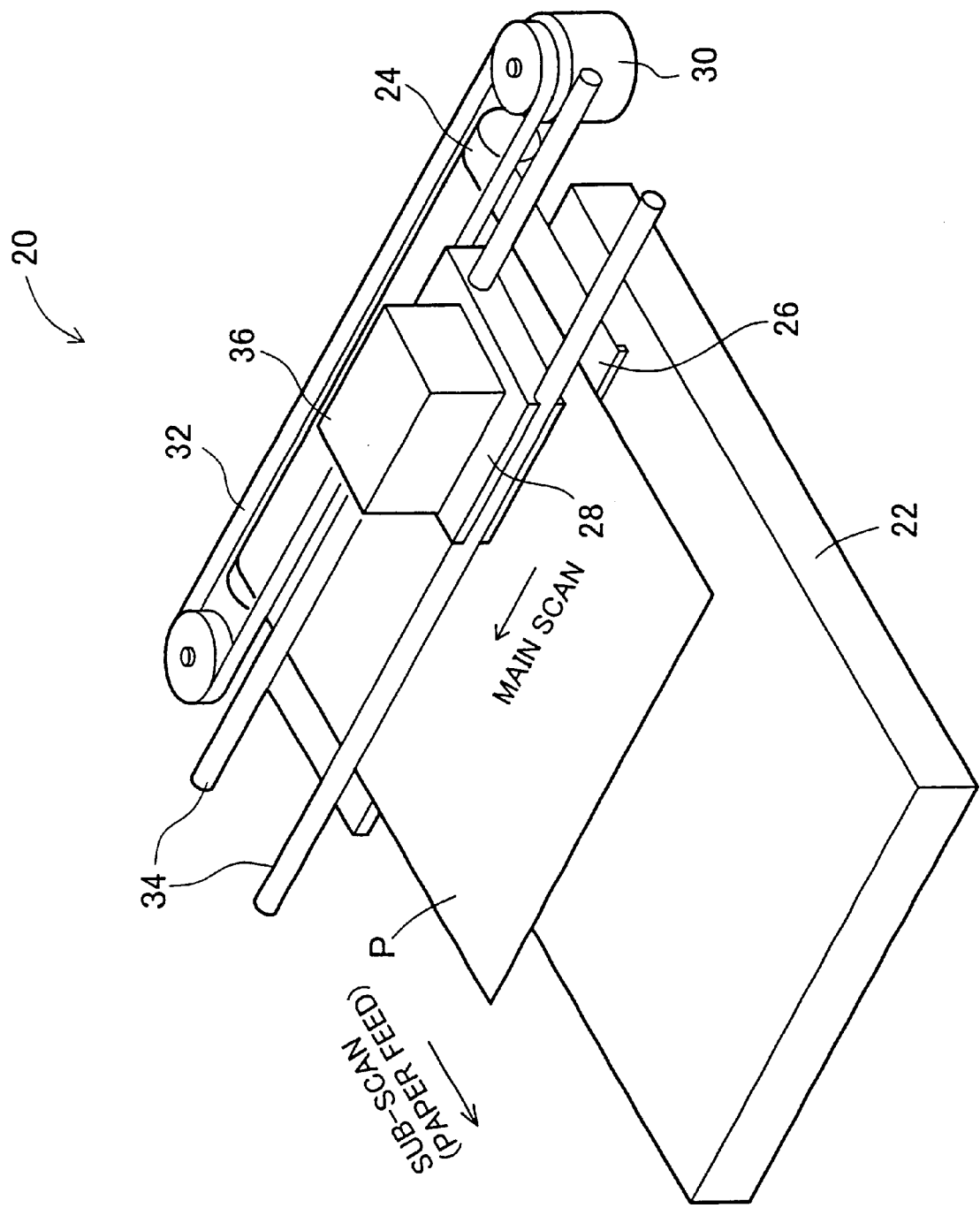
FIG. 1 is a general perspective view of the main structure of a color inkjet printer 20 which is an embodiment of the invention.

FIG. 1 is a general perspective view of the configuration of a color inkjet printer 20 which is an embodiment of the invention. The printer 20 includes a paper stacker 22, a feed roller 24 driven by a step motor (not shown), a platen 26, a carriage 28, a step motor 30, a drive belt 32 driven by the step motor 30, and guide rails 34 for the carriage 28. Mounted on the carriage 28 is a print head 36 that has a plurality of nozzles.

The feed roller 24 draws paper P from the stacker 22 and feeds the paper in the sub-scanning direction over the face of the platen 26. The carriage 28 is moved along the guide rails 34 by the action of the drive belt 32 driven by the step motor 30. The main scanning direction is perpendicular to the sub-scanning direction.

Figure 2:
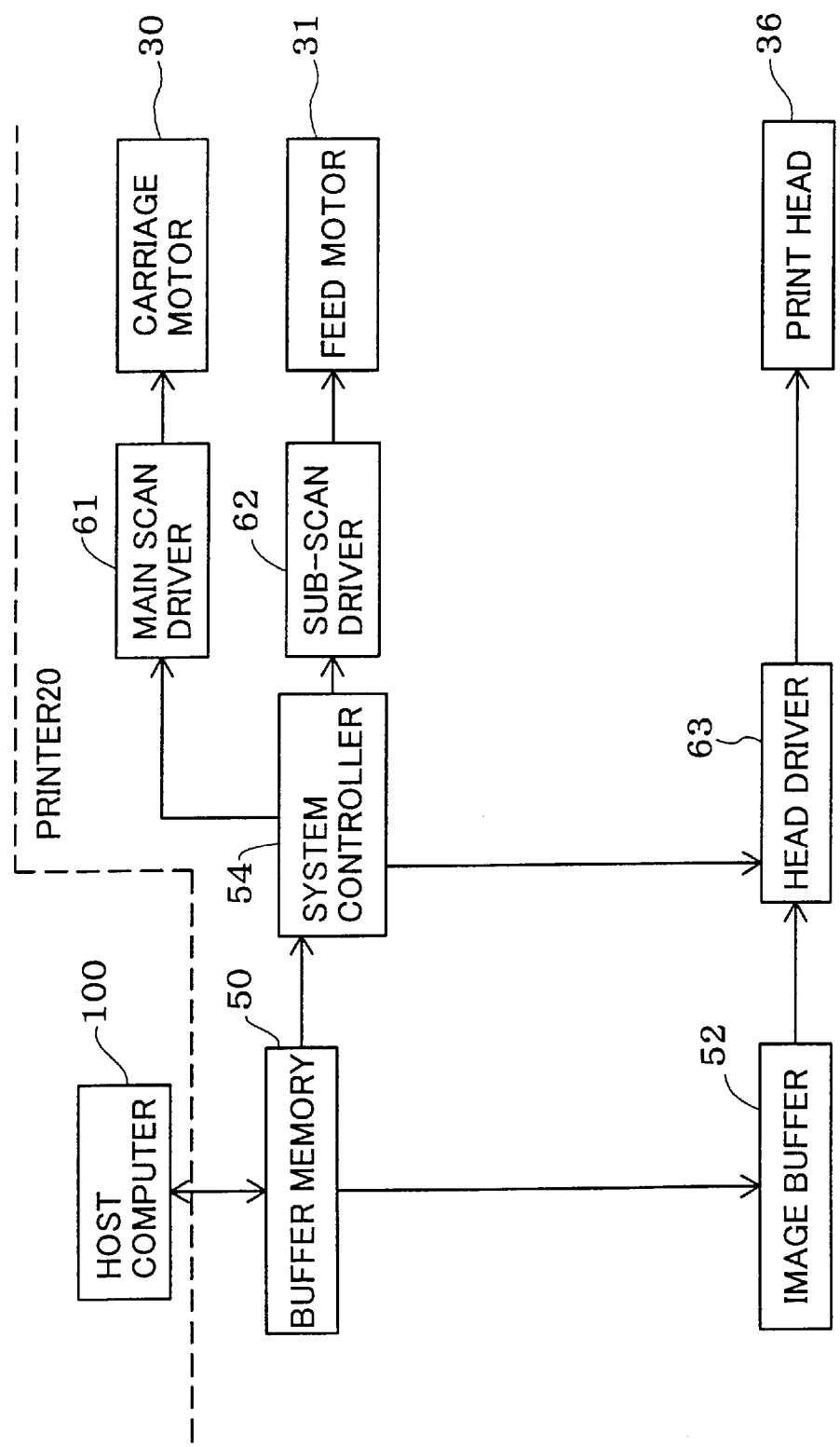
FIG. 2 is a block diagram of the electrical system of the printer 20.

FIG. 2 is a block diagram of the electrical system of the printer 20. The printer 20 includes a receive buffer memory 50 for receiving signals from a host computer 100, an image buffer memory 52 for storing printing data, and a system controller 54 that controls the overall operation of the printer 20. Connected to the system controller 54 are a main scanning driver 61 for the carriage motor 30, a sub-scanning driver 62 for a feed motor 31, and a head driver 63 for the print head 36.

Based on the printing scheme specified by a user, a printer driver (not shown) of the host computer 100 determines the various parameters that define the printing operations. Based on these parameters, the printer driver generates the printing data needed to effect the printing by the printing scheme concerned, and transfers the printing data to the printer 20, where it is placed in the receive buffer memory 50. The system controller 54 reads the required information contained in the printing data and based on that information sends control signals to the drivers 61, 62 and 63.

The printing data is broken down into the individual color components to obtain image data for each color component which is stored in the receive buffer memory 50. In accordance with the control signals from the system controller 54, the head driver 63 reads out the color component image data from the image buffer memory 52 and uses the data to drive the array of nozzles on the print head 36.

B. Print Head Configuration

Figure 3:
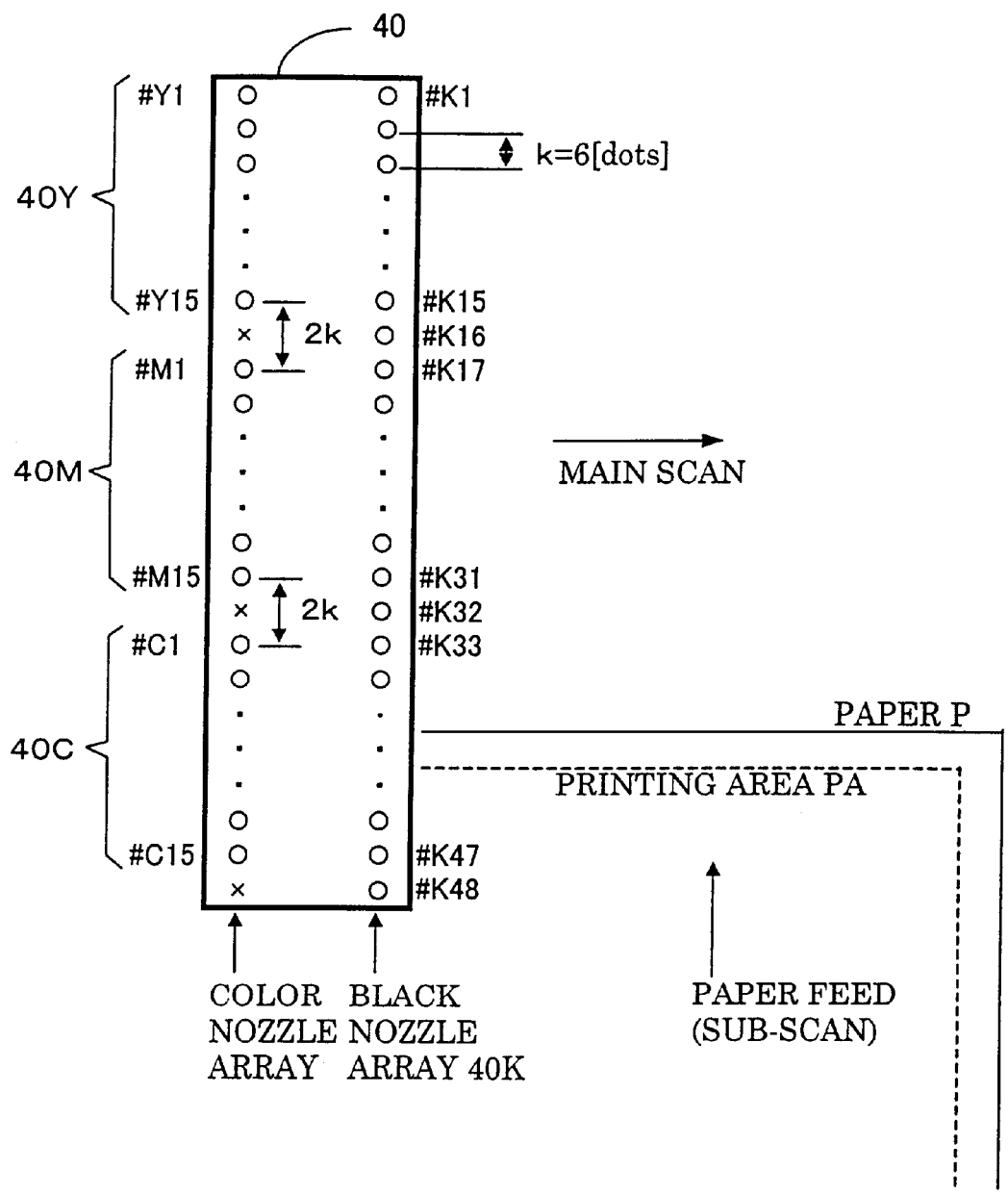
FIG. 3 shows the arrangement of the nozzles formed in the bottom surface of an actuator 40.

FIG. 3 illustrates the arrangement of the nozzles formed in the bottom surface of an actuator 40 provided on the lower part of the print head 36. These nozzles comprise a straight row (array) of color nozzles and a straight row of black nozzles, each arrayed in the sub-scanning direction. Here, "actuator" refers to an ink emission structure that includes nozzles and drive elements for emitting ink such as, for example, piezo-electric elements or heaters. Generally, an actuator nozzle portion is formed in one piece of ceramics. Forming two rows of nozzles in one actuator allows the nozzles to be positioned precisely, resulting in improved image quality.

The array of black nozzles comprises 48 nozzles numbered #K1 to #K48, arrayed in the sub-scanning direction at a constant nozzle pitch k. The nozzle pitch k is six dots. However, for the dot pitch on the paper P, this pitch k may be set at a value that is a multiple of any integer of two or more.

The array of color nozzles includes a group of yellow nozzles 40Y, a group of magenta nozzles 40M and a group of cyan nozzles 40C. Herein, groups of color nozzles are also referred to as groups of chromatic color nozzles. The group of yellow nozzles 40Y has 15 nozzles, numbered #Y1 to #Y15, arrayed at the same pitch k as the black nozzles. The same also applies to the group of magenta nozzles 40M and the group of cyan nozzles 40C. The "x" mark between the lowermost of the yellow nozzles, nozzle #Y15, and the topmost of the magenta nozzles, nozzle #M1, indicates that there is no nozzle formed at that position. Therefore, the space between nozzles #Y15 and #M1 is twice the nozzle pitch k. This also applies to the space between nozzle #M15 and #C1. That is to say, the spacing between the groups of yellow, magenta and cyan nozzles is set at twice the nozzle pitch k.

Like the array of black nozzles 40K, the nozzles of the color nozzle groups 40Y, 40M and 40C are arrayed in the sub-scanning direction. However, in the case of the chromatic color nozzle array, there are no nozzles at the positions corresponding to the 16th, 32nd and 48th black nozzles #K16, #K32 and #K48.

During printing, droplets of ink are expelled from the nozzles as the print head 36 and carriage 28 are moved in the main scanning direction. Depending on the printing scheme, a portion rather than all of the nozzles may be used.

C. Basic Conditions of General Recording Scheme

Before describing the dot recording schemes used in the embodiment of the present invention, the following describes basic conditions required for general printing schemes. In this specification, "dot recording scheme" and "printing scheme" have the same meaning.

Figure 4:
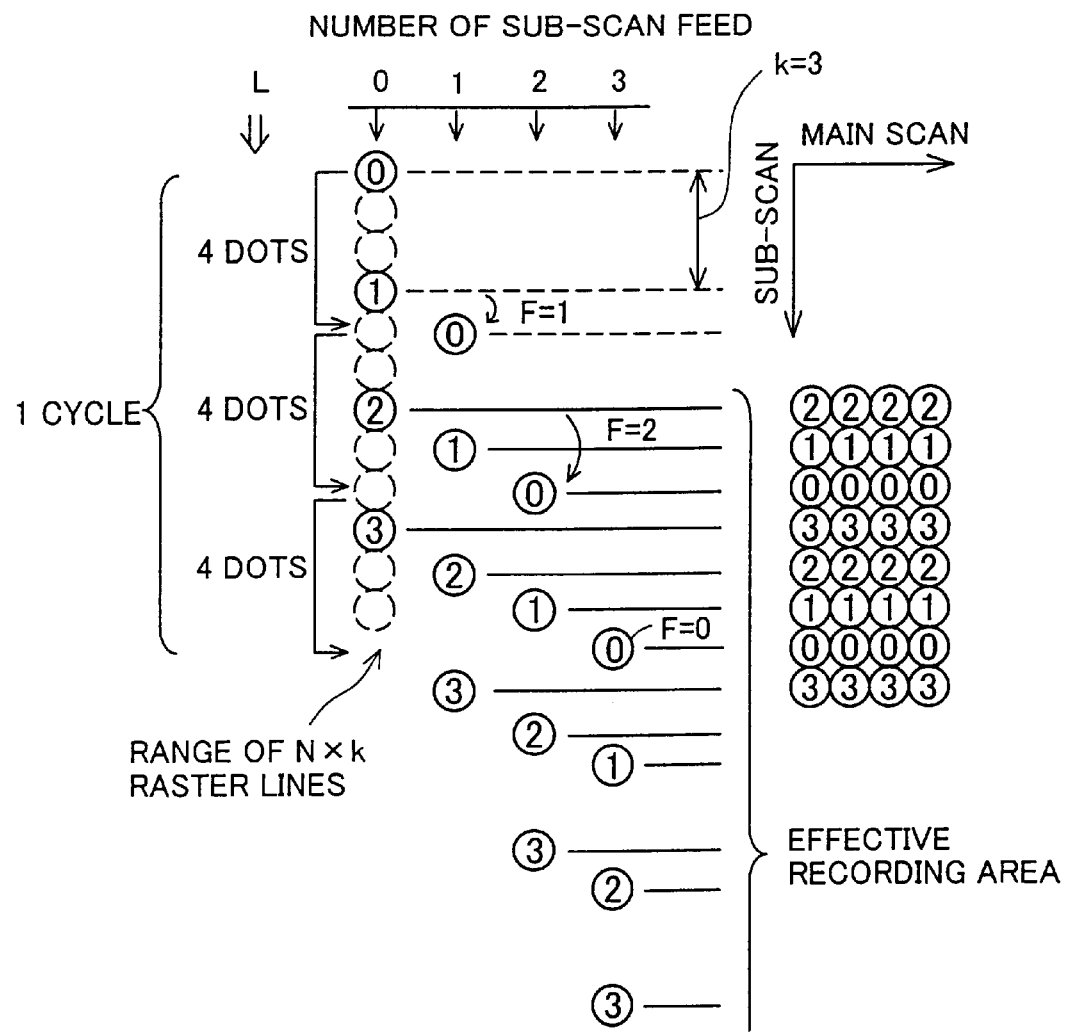
FIGS. 4(A) and 4(B) show the basic conditions of a dot printing scheme in which the number of scan repeats is one.

FIGS. 4(A) and 4(B) show basic conditions of a general dot recording scheme when the number of scan repeats s is equal to one. FIG. 4(A) illustrates an example of sub-scan feeds with four nozzles, and FIG. 4(B) shows parameters of the dot recording scheme. In the drawing of FIG. 4(A), solid circles including numerals indicate the positions of the four nozzles in the sub-scanning direction after each sub-scan feed. The encircled numerals 0 through 3 denote the nozzle numbers. The four nozzles are shifted in the sub-scanning direction every time when one main scan is concluded. Actually, however, the sub-scan feed is executed by feeding a printing paper with the sheet feed motor 23 (FIG. 2).

As shown on the left-hand side of FIG. 4(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 4(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area (or the "non-effective print area)". All the area which is scanned with the nozzles (including both the effective record area and the non-effective record area) is referred to as the nozzle scan area.

Various parameters related to the dot recording scheme are shown in FIG. 4(B). The parameters of the dot recording scheme include the nozzle pitch k [dots], the number of used nozzles N, the number of scan repeats s, number of effective nozzles Neff, and the sub-scan feed amount L [dots].

In the example of FIGS. 4(A) and 4(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 4(A) and 4(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 4(B) shows the sub-scan feed amount L, its accumulated value ΣL, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 5(A)). For example, as shown in FIG. 4(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 4(A)). Similarly, the position of the nozzles after the second sub-scan feed is $\Sigma L(=8)$ dots away from the initial position so that the offset F is 2. The position of the nozzles after the third sub-scan feed is $\Sigma L(=12)$ dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by $(\Sigma L)\%k$, where $\Sigma L$ is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k−1).

Condition c3: Average sub-scan feed amount $(\Sigma L/k)$ is equal to the number of used nozzles N. In other words, the accumulated value $\Sigma L$ of the sub-scan feed amount L for the whole feed cycle is equal to a product (N×k) of the number of used nozzles N and the nozzle pitch k.

The above conditions can be understood as follows. Since (k−1) raster lines are present between adjoining nozzles, the number of sub-scan feeds required in one feed cycle is equal to k so that the (k−1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k−1). The second condition c2 is accordingly required.

When the first and the second conditions c1 and c2 are satisfied, each of the N nozzles records k raster lines in one feed cycle. Namely N×k raster lines can be recorded in one feed cycle. When the third condition c3 is satisfied, the nozzle position after one feed cycle (that is, after the k sub-scan feeds) is away from the initial position by the N×k raster lines as shown in FIG. 4(A). Satisfying the above first through the third conditions c1 to c3 thus prevents skipping or overwriting of raster lines to be recorded in the range of N×k raster lines.

Figure 5:
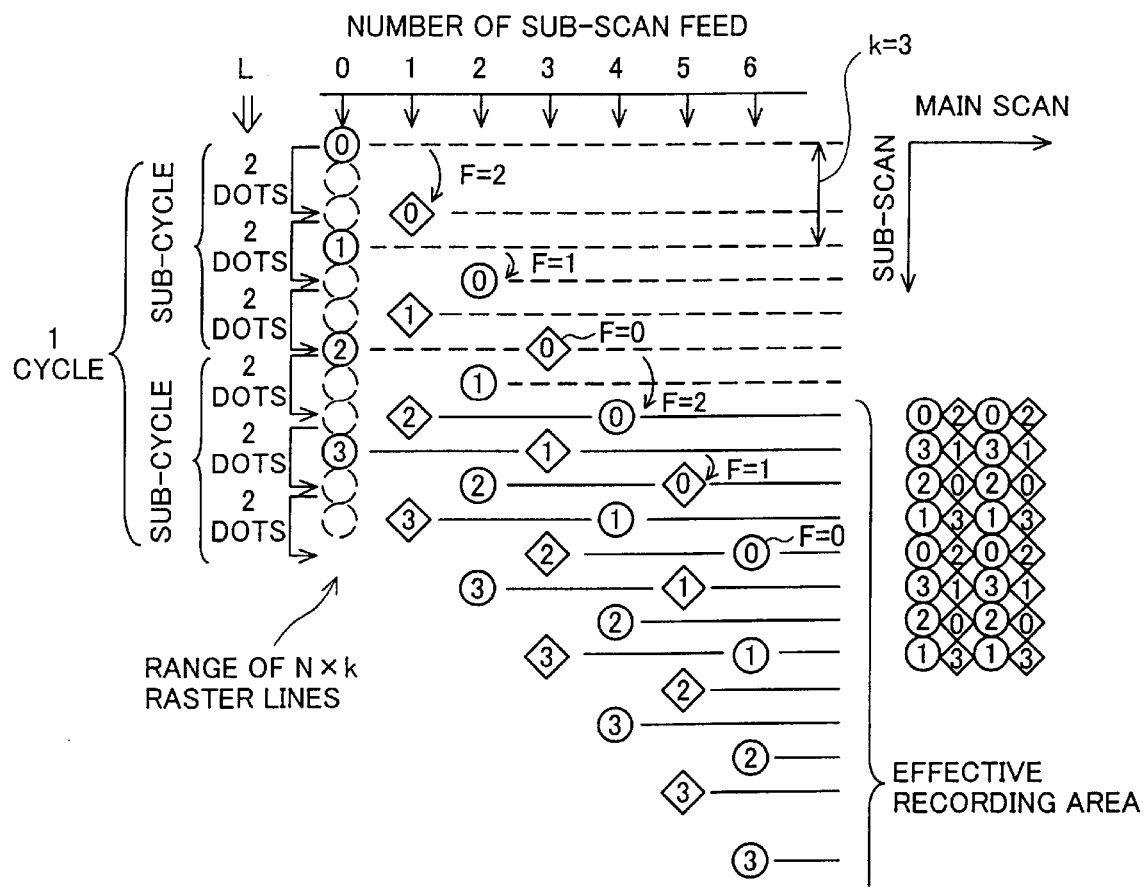
FIGS. 5(A) and 5(B) show the basic conditions of a dot printing scheme in which the number of scan repeats is two or more.

FIGS. 5(A) and 5(B) show the basic conditions of a general dot recording scheme when the number of scan repeats s is at least 2. When the number of scan repeats s is 2 or greater, each raster line is recorded with s different nozzles. In the description hereinafter, the dot recording scheme adopted when the number of scan repeats s is at least 2 is referred to as the "overlap scheme".

The dot recording scheme shown in FIGS. 5(A) and 5(B) amounts to that obtained by changing the number of scan repeats s and the sub-scan feed amount L among the dot recording scheme parameters shown in FIG. 4(B). As will be understood from FIG. 5(A), the sub-scan feed amount L in the dot recording scheme of FIGS. 5(A) and 5(B) is a constant value of two dots. In FIG. 5(A), the nozzle positions after the odd-numbered sub-scan feeds are indicated by the diamonds. As shown on the right-hand side of FIG. 5(A), the dot positions recorded after the odd-numbered sub-scan feed are shifted by one dot in the main scanning direction from the dot positions recorded after the even-numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 5(A). In one possible scheme, dot recording is executed at the positions indicated by the circles shown in the right-hand side of FIG. 5(A) after the first sub-scan feed, and is executed at the shifted positions indicated by the diamonds after the fourth sub-scan feed.

The lower-most row of the table of FIG. 5(B) shows the values of the offset F after each sub-scan feed in one feed cycle. One feed cycle includes six sub-scan feeds. The offsets F after each of the six sub-scan feeds assume every value between 0 and 2, twice. The shift in the offset F after the first through the third sub-scan feeds is identical with that after the fourth through the sixth sub-scan feeds. As shown on the left-hand side of FIG. 6(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of at least 2, the first through the third conditions c1 to c3 discussed above are rewritten into the following conditions c1' through c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k−1), s times.

Condition c3': Average sub-scan feed amount $\{\Sigma L/(k\times s)\}$ is equal to the number of effective nozzles Neff (=N/s). In other words, the accumulated value $\Sigma L$ of the sub-scan feed amount L for the whole feed cycle is equal to a product $\{\text{Neff}\times(k\times s)\}$ of the number of effective nozzles Neff and the number of sub-scan feeds (k×s).

The above conditions c1' through c3' hold even when the number of scan repeats s is one. This means that the conditions c1' through c3' generally hold for the dot recording scheme irrespective of the number of scan repeats s. When these three conditions c1' through c3' are satisfied, there is no skipping or overwriting of dots recorded in the effective record area. If the overlap scheme is applied (if the number of scan repeats s is at least 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1' through c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

D. First Embodiment of the Printing Scheme

FIG. 6 shows the scanning parameters used in a first embodiment of the printing scheme of the invention. In this first embodiment, the nozzle pitch k is six dots, the number of scan repeats is one, the number of working nozzles N is 13 and the number of effective nozzles Neff is 13.

The table in FIG. 6 lists the parameters for each of the first through seventh passes. Herein, a main scan is also referred to as a pass. For each pass, the table shows the sub-scan feed amount L just prior to the pass, the cumulative feed value ΣL and the offset F. The sub-scan feed amount L is a fixed value of 13 dots. This printing scheme (scanning scheme) in which L is a fixed value is referred to as a set feed scheme. The scanning parameters of the first embodiment satisfy the aforementioned conditions c1' to c3'.

Figure 7:
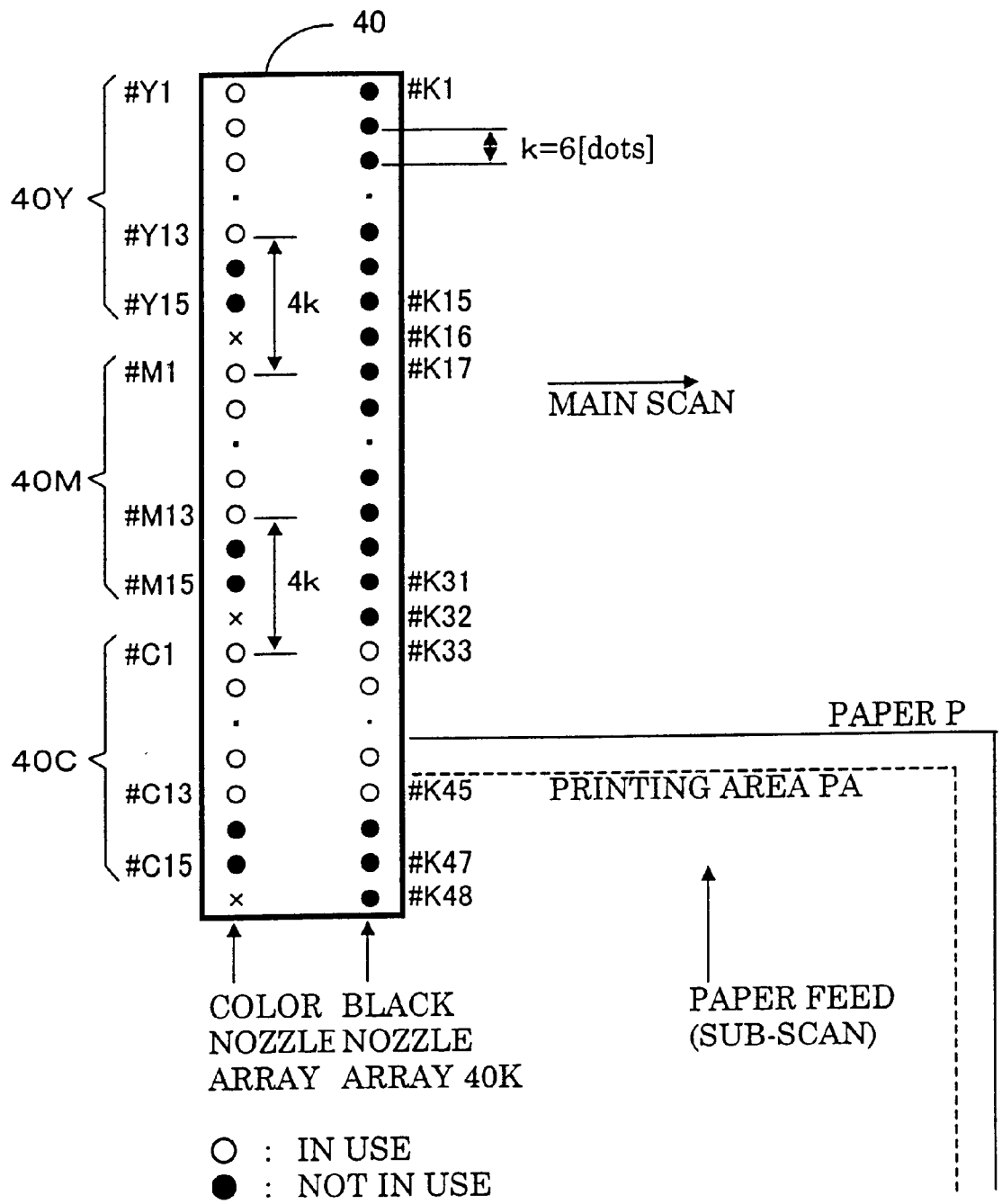
FIG. 7 shows the nozzles used in the first embodiment.

FIG. 7 is a diagram illustrating the nozzles used in the first embodiment. The actuator 40 shown in FIG. 7 is the same as the one shown in FIG. 3, but in the first embodiment only some of the nozzles are used. The open circles indicate the nozzles that are used, and the solid circles indicate the nozzles that are not used. Thus, of the 15 nozzles for each chromatic color ink, just the first 13 are used. With respect to black ink, just the 13 nozzles in the sub-scanning locations corresponding to the cyan nozzles #C1 to #C13 are used. With the same number of nozzles being used for each of the four inks, by scanning using the same parameters for all nozzles, dots of each color can be formed without voids or undesired overlaps.

Herein, the groups of nozzles used for each ink are also referred to as working nozzle groups. Also, the groups of nozzles provided on the actuator 40 for each ink are also referred to as implemented nozzle groups.

Nozzles arrayed at nozzle pitch k are selected to serve as the working nozzles. The nozzle #Y13 at the lower end of the group of yellow nozzles and the nozzle #M1 at the upper end of the group of magenta nozzles are separated by a space that is four times the nozzle pitch k (4k), meaning 24 dots. The nozzle #M13 at the lower end of the group of magenta nozzles and the nozzle #C1 at the upper end of the group of cyan nozzles are also separated by 4k.

Figure 8:
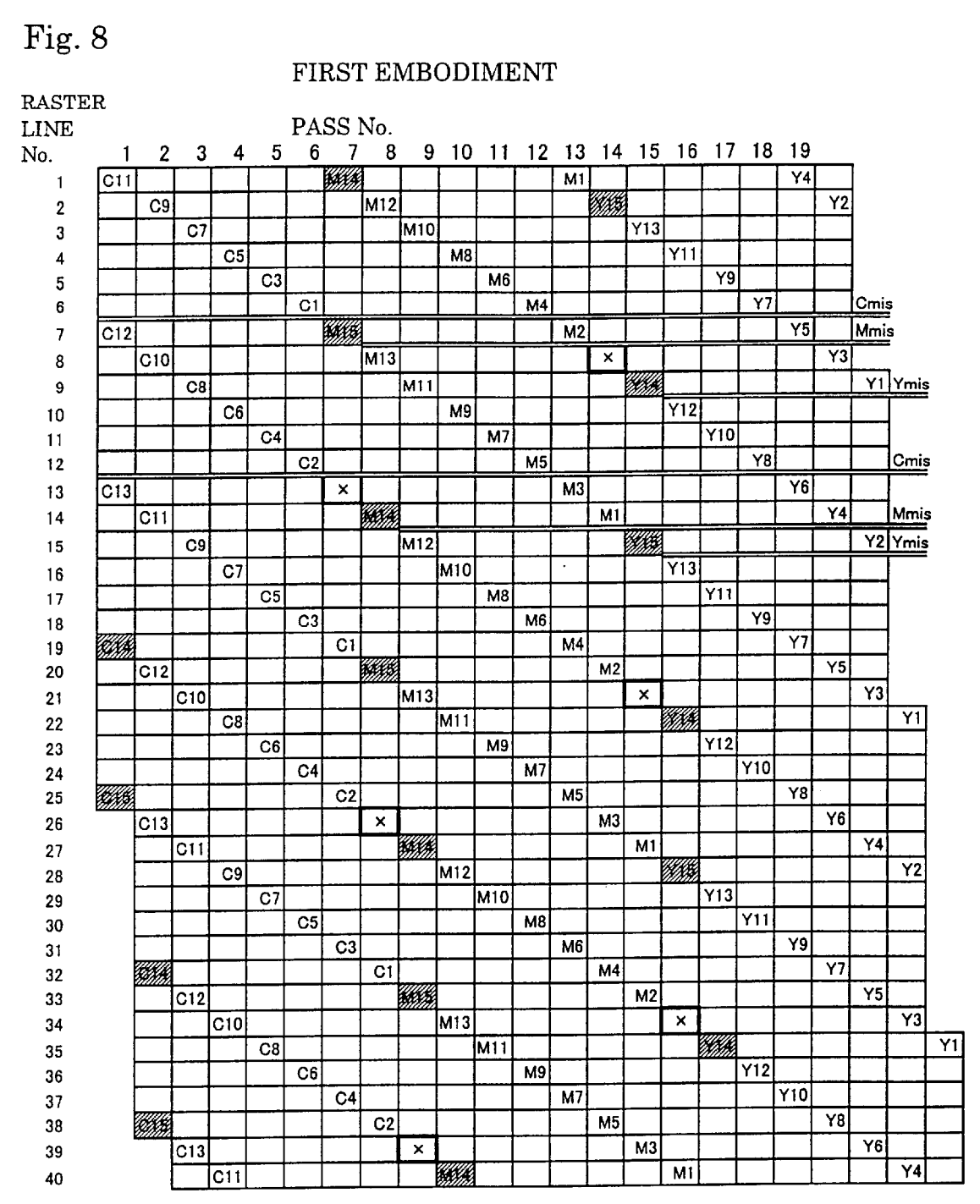

With respect to the first embodiment, FIG. 8 is an explanatory diagram of the nozzles used to form the raster lines during each pass, within the effective printing area. In pass 1, nozzles #C11, #C12 and #C13 form dots on the effective raster lines 1, 7 and 13, respectively. An effective raster line is a raster line within the effective printing area. In FIG. 8, the symbol "#" that precedes nozzle numbers is omitted. Hatching indicates nozzles that are not being used. The symbol "x" indicates a location between adjacent groups of working nozzles where there is no nozzle.

For pass 2, the target printing position of the actuator 40 is moved the equivalent of 13 dots away from pass 1 in the sub-scanning direction. In this embodiment the nozzle pitch k is 6, so after the sub-scanning feed, the nozzle position offset F (what remains after the cumulative feed ΣL is divided by k) is one dot. In the case of pass 2, therefore, the target raster line appear to be one line below the target raster line of pass 1. In fact, of course, the target raster line for the same nozzle is 13 lines below. In this first embodiment the sub-scanning feed amount L is fixed at 13 dots, so that each time a sub-scanning feed is effected, the position of the target raster line appears to move down one line.

As explained below, with respect to cyan, the cumulative feed error in the sub-scanning direction reaches a maximum at Cmis between raster lines 6 and 7. Raster line 6 is printed on pass 6, while raster line 7 is printed during pass 1. This means that there are five sub-scanning feeds between the printing of raster line 7 during pass 1 and the printing of raster line 6 on pass 6, resulting in the accumulation of the errors of the five feeds. This accumulation of the errors of five feeds also happens between cyan raster lines 12 and 13.

The same type of observation reveals that in the case of magenta, too, the cumulative feed error becomes relatively large at Mmis between raster lines 7 and 8. Similarly, in the case of yellow the cumulative feed error becomes relatively large at Ymis between raster lines 7 and 8. Hereinbelow the position at which the cumulative value of the sub-scanning feed error becomes relatively large is referred to as the accumulated error position.

As can be understood from the above explanation, in the case of the first embodiment the accumulated error position is different for each chromatic color ink. Accumulated error positions are more prone to the formation of banding, which are lines that extend in the main scanning direction, degrading the image quality. However, since in accordance with this first embodiment the accumulated error position is different for each ink color, banding at these positions is less noticeable.

Figure 9:
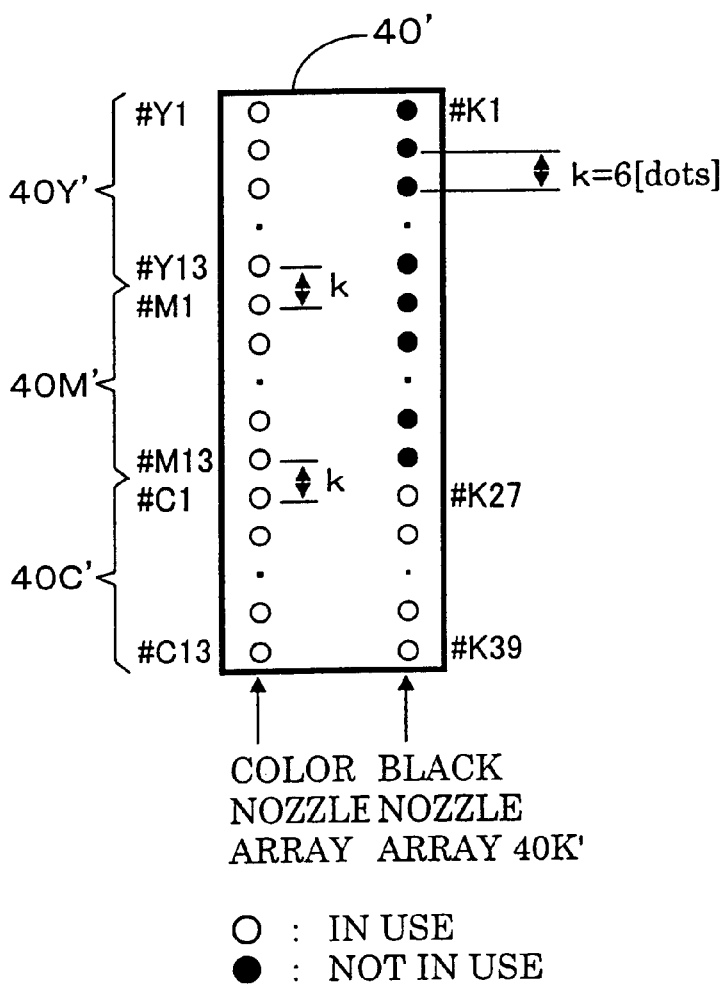
FIG. 9 shows the nozzles used in a first comparative example.

FIG. 9 shows the actuator used in a first comparative example. The actuator 40' is comprised of a group of 13 yellow nozzles 40Y', a group of 13 magenta nozzles 40M' and a group of 13 cyan nozzles 40C'. The spacing between the adjacent end nozzles of the groups is the same as the nozzle pitch k. That is, on the actuator 40' of FIG. 9 the 13 nozzles of each chromatic color used in the arrangement of the first embodiment are arrayed at a nozzle pitch k. The group of black ink nozzles 40K' comprises 39 nozzles, also arrayed at pitch k. The arrangement of this first comparative example uses this actuator 40' to effect printing in accordance with the same scanning parameters as those of the first embodiment shown in FIG. 6.

FIG. 10 is an explanatory diagram showing the nozzles used to form the raster lines during each pass, within the effective printing area, in the case of the first comparative example. The accumulated error positions Cmis, Mmis, Ymis of the three chromatic color inks all fall between raster lines 6 and 7 and between raster lines 12 and 13. In this case banding tends to be more noticeable, and is therefore highly likely to degrade the image quality.

As can be seen from a comparison between the working nozzles of FIGS. 7 and 9, the only difference between the first embodiment and the first comparative example is the spacing between the groups of working nozzles. Specifically, in the case of the first embodiment the spacing between the groups is set at 4k (four times the nozzle pitch k) while in the case of the first comparative example the spacing is the same as the nozzle pitch k. This difference in the spacing between the groups of working nozzles is manifested in the differences between the accumulated error positions Cmis, Mmis and Ymis seen in FIGS. 8 and 10.

To avoid as far as possible the accumulated error positions of adjacent nozzle groups coinciding in the sub-scanning direction, it is desirable to use a selection of working nozzles that results in the spacing between adjacent groups of working nozzles being M times the nozzle pitch k, where M is an integer of 2 or more.

Figure 11:
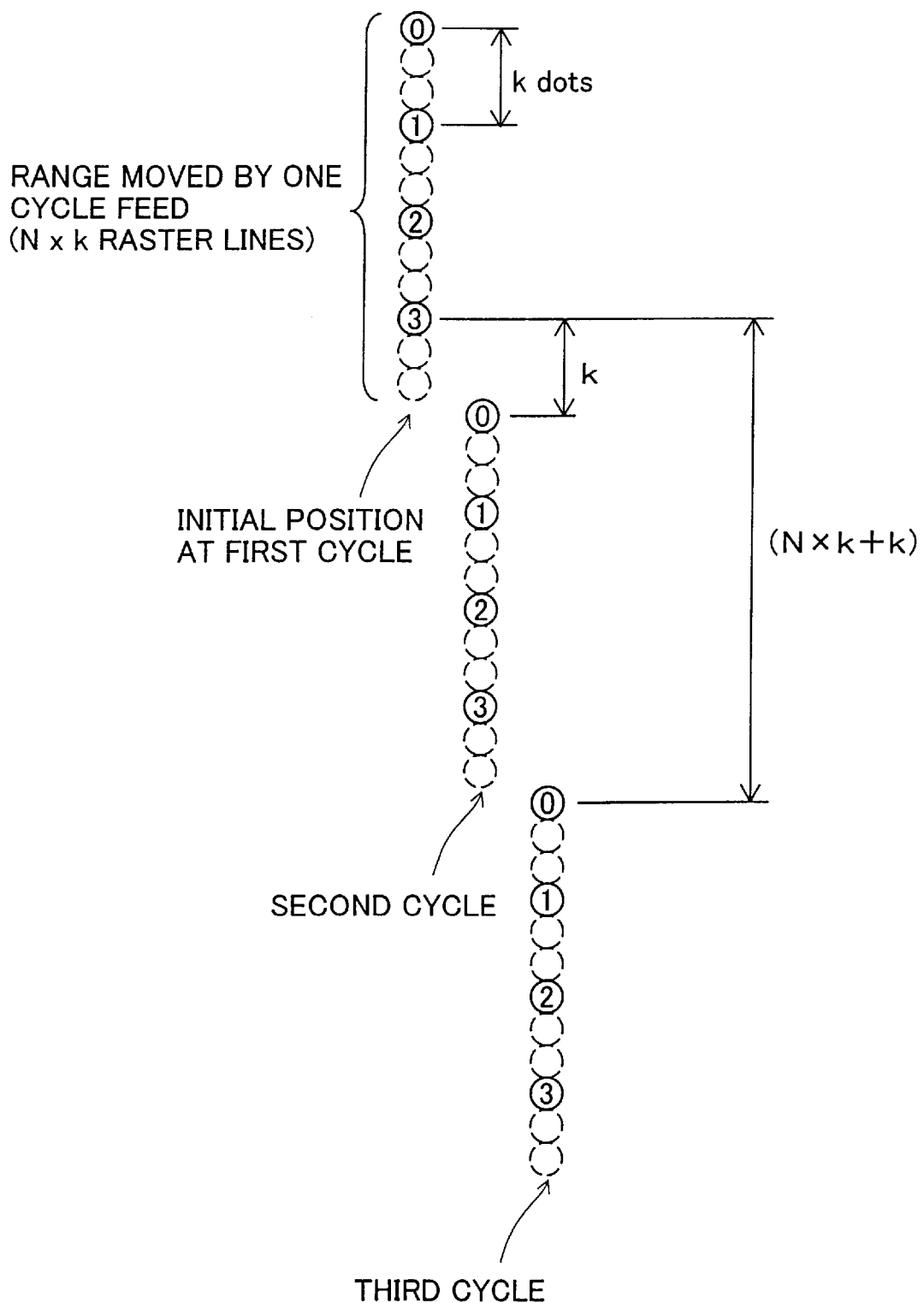
FIG. 11 shows an equivalent nozzle positioning arrangement.

However, it is also desirable for the spacing between adjacent groups of working nozzles to be set as follows. FIG. 11 illustrates an equivalent nozzle positioning arrangement used in the printing scheme of FIG. 4(A). As also explained with reference to FIG. 4(A), when the number of scan repeats is one, one scanning cycle includes k sub-scanning feeds. Therefore, the amount by which the nozzle group is moved by the sub-scanning feed of one cycle is N×k raster lines. FIG. 11 shows the initial position of the nozzle group in each of the first through third cycles. Since the same printing operation is implemented from these three nozzle group positions, the positions are mutually equivalent. The spacing between the nozzle at the lower end at the initial position in the first cycle and the nozzle at the upper end at the initial position in the second cycle is k dots. Also, the spacing between the nozzle at the lower end at the initial position in the first cycle and the nozzle at the upper end at the initial position in the third cycle is (N×k+k) dots. While not illustrated, it can be understood that the spacing between the nozzle at the lower end at the initial position in the first cycle and the nozzle at the upper end at the initial position in the fourth cycle will be (2×N×k+k) dots. Normally the spacing between the nozzle at the lower end at the initial position in the first cycle and the nozzle at the upper end of another equivalent nozzle group is expressed as (N×n+1)k dots. Here, n is an arbitrary integer of zero or more.

When working nozzle groups used for different inks are disposed in the type of equivalent positional arrangement shown in FIG. 11, the result is a mutual coincidence of the accumulated error positions in respect of those inks. To prevent this happening, it is desirable to set the spacing between adjacent groups of working nozzles to a value other than (N×n+1) k dots (N being the number of working nozzles and n an arbitrary integer of one or more). Here, n is specified as being one or more rather than zero or more because if, as described above, the spacing between adjacent groups of working nozzles is M times the nozzle pitch k, where M is an integer of 2 or more, n=0 would be excluded.

E. Second Embodiment

FIG. 12 shows the scanning parameters used in a second embodiment of the printing system of the invention. In this second embodiment, the nozzle pitch k is six dots, the number of scans s is one, the number of working nozzles N is 15 and the number of effective nozzles Neff is 15.

The table in FIG. 12 lists the parameters for each of the first through seventh passes. Three sub-scan feed amounts L are used, which are 14, 15 and 16 dots. This printing scheme (scanning scheme) in which a plurality of L values is used is referred to as a variable feed scheme. The scanning parameters of this second embodiment satisfy the above conditions c1' to c3'.

Figure 13:
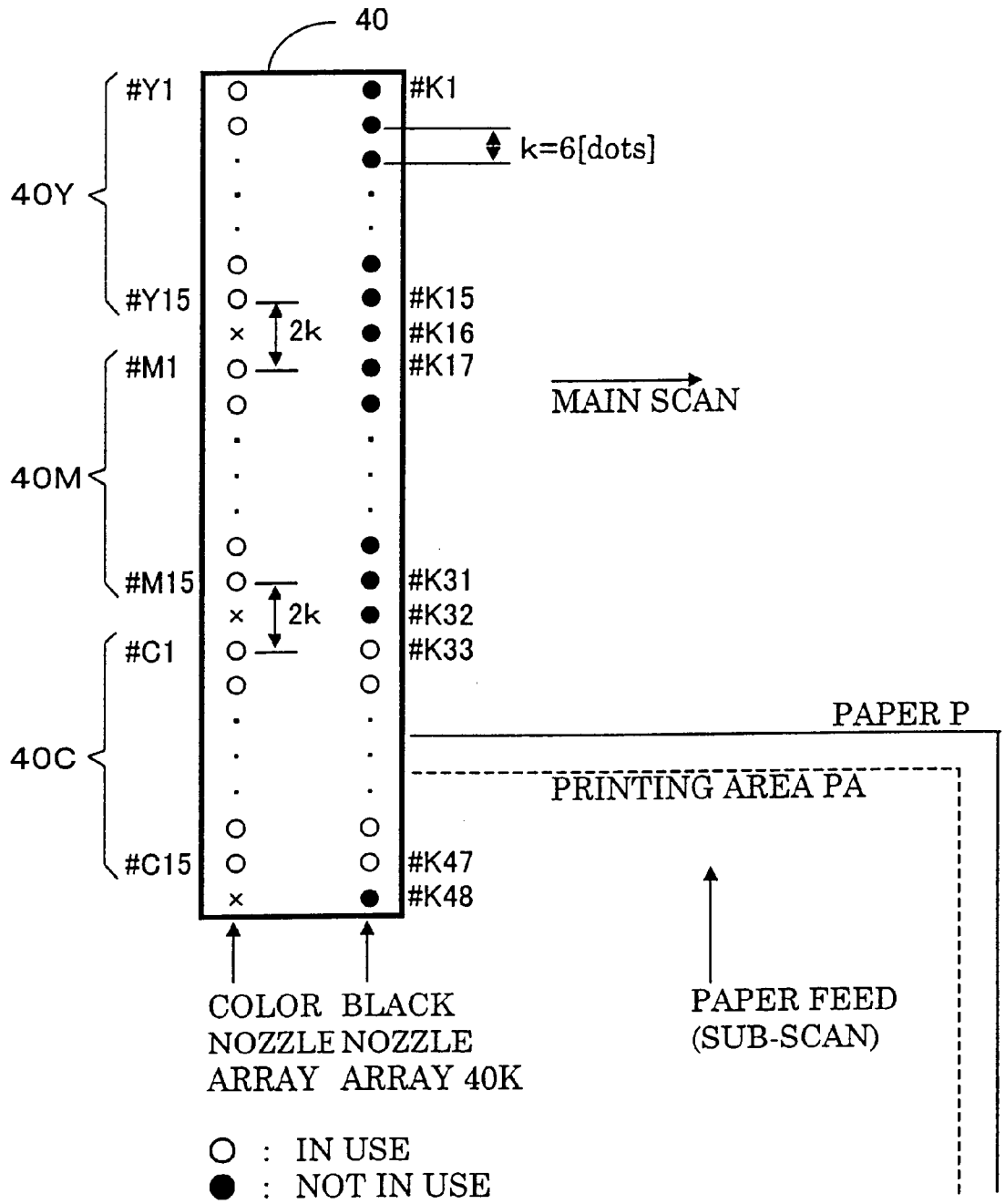
FIG. 13 shows the nozzles used in the second embodiment.

FIG. 13 shows the nozzles used in the second embodiment. The actuator 40 shown in FIG. 13 is the same as the one shown in FIG. 3, but in this case all of the 15 nozzles of each chromatic ink color are used. With respect to black ink, just the 15 nozzles in the sub-scanning locations corresponding to the cyan nozzles #C1 to #C15 are used. The nozzle #Y15 at the lower end of the group of yellow nozzles and the nozzle #M1 at the upper end of the group of magenta nozzles are separated by an amount that is two times the nozzle pitch k (2k), and the separation between the nozzle #M15 at the lower end of the group of magenta nozzles and the nozzle #C1 at the upper end of the group of cyan nozzles is also 2k.

FIG. 14 is an explanatory diagram showing the nozzles used to form the raster lines during each pass within the effective printing area, in the case of the second embodiment. Since the second embodiment uses a variable feed scheme, the positioning of the nozzle groups on each pass is not as regular as in the first embodiment, the advantage of which is that the cumulative sub-scanning feed error is smaller than in the first embodiment.

Another advantage of the second embodiment is that the accumulated error positions of adjacent nozzle groups are not always the same. In the case of cyan, the biggest difference in the sub-scanning feed passes is 4, between raster lines 2 and 3. That is, there is a accumulated feed error Cmis between raster lines 2 and 3. With respect also to magenta and yellow, accumulated feed errors Mmis, Ymis are located between raster lines 2 and 3. However, the next Cmis and Mmis are between raster lines 8 and 9, while the next Ymis is between raster lines 7 and 8.

Thus, in the second embodiment the accumulated error positions of the three working nozzle groups Cmis, Mmis, Ymis do not always coincide, so there is less banding compared to when the the positions do always coincide.

Figure 15:
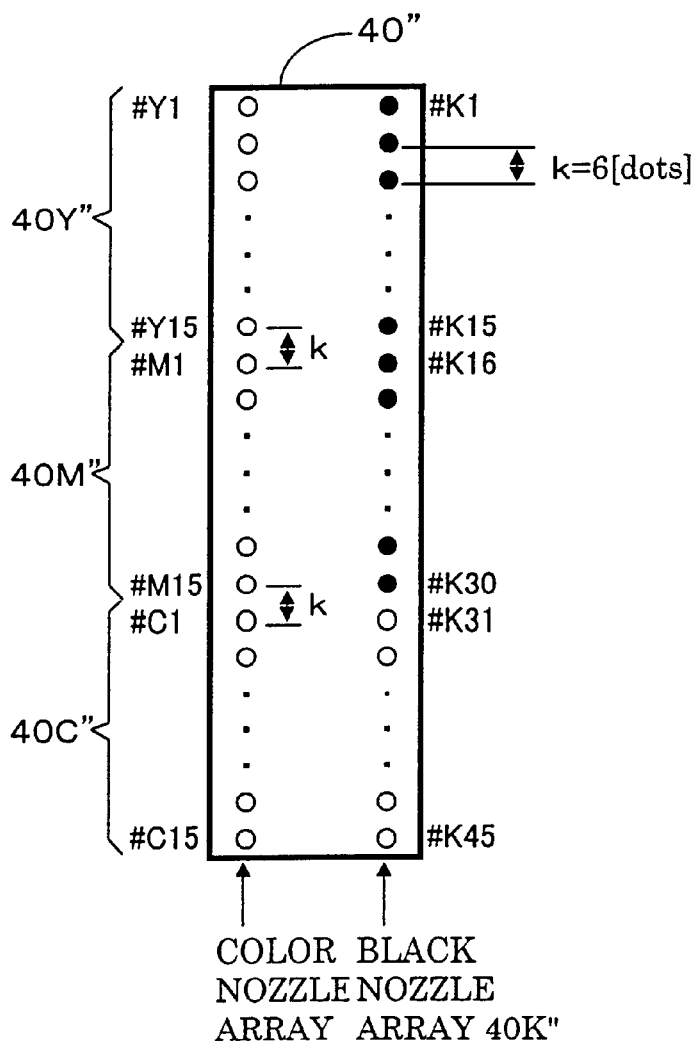
FIG. 15 shows the nozzles used in a second comparative example.

FIG. 15 shows the actuator used in a second comparative example. The actuator 40" is comprised of a group of 15 yellow nozzles 40Y", a group of magenta nozzles 40M" and a group of 15 cyan nozzles 40C". The spacing between the adjacent end nozzles of the groups is equal to the nozzle pitch k. The group of black ink nozzles 40K" comprises 45 nozzles. The arrangement of the second comparative example uses this actuator 40" to effect printing in accordance with the same scanning parameters as those of the second embodiment shown in FIG. 12.

FIG. 16 is an explanatory diagram showing the nozzles used to form the raster lines during each pass, within the effective printing area, in the case of the first comparative example. The accumulated error positions Cmis, Mmis, Ymis of the three chromatic color inks fall between raster lines 2 and 3, 8 and 9 and 14 and 15. That is, in the first comparative example the accumulated error positions Cmis, Mmis, Ymis of the three colored inks always coincide and are repeated at six-dot intervals (that is, at the same pitch as the nozzle pitch k), making banding more noticeable.

As can be seen by comparing the working nozzles of FIGS. 13 and 15, the only difference between the second embodiment and the second comparative example is the spacing between the groups of working nozzles. In the second embodiment the spacing between the groups is set at 2k (two times the nozzle pitch k), while in the second comparative example the spacing is the same as the nozzle pitch k. This difference in the spacing between the groups of working nozzles is manifested in the differences in accumulated error positions Cmis, Mmis and Ymis seen in FIGS. 14 and 16.

As in the first embodiment, the second embodiment uses a selection of working nozzles that results in the spacing between groups of working nozzles being M times the nozzle pitch k, where M is an integer of 2 or more. Also, the spacing between adjacent groups of working nozzles is set at a value other than (N×n+1) k dots (where N is the number of working nozzles and n is an arbitrary integer of 1 or more).

As shown by FIG. 13, the second embodiment uses all of the chromatic color ink nozzles provided on the actuator 40. Since the spacing between implemented nozzle groups is set to be twice the nozzle pitch k, even though all of the chromatic color ink nozzles are used, this does not result in the accumulated sub-scan feed error positions in respect of those inks always coinciding. The advantage of this is that using as many of the actuator 40's nozzles as possible makes it possible to print high-quality images.

Generally it is preferable for the spacing between groups of implemented nozzles arrayed in the sub-scanning direction (that is, the spacing between the end nozzles of the adjacent groups of implemented nozzles for each ink) to be m times the nozzle pitch k (where m is an integer of two or more), since this enables the use of the most nozzles, resulting in higher print quality.

The spacing between the groups of implemented nozzles arrayed in the sub-scanning direction can also be set to be equal to the nozzle pitch k. In such a case, the working nozzle group configurations of the first and second embodiments can be implemented by not using some of the nozzles as working nozzles.

F. Actuator Variations

Figure 17:
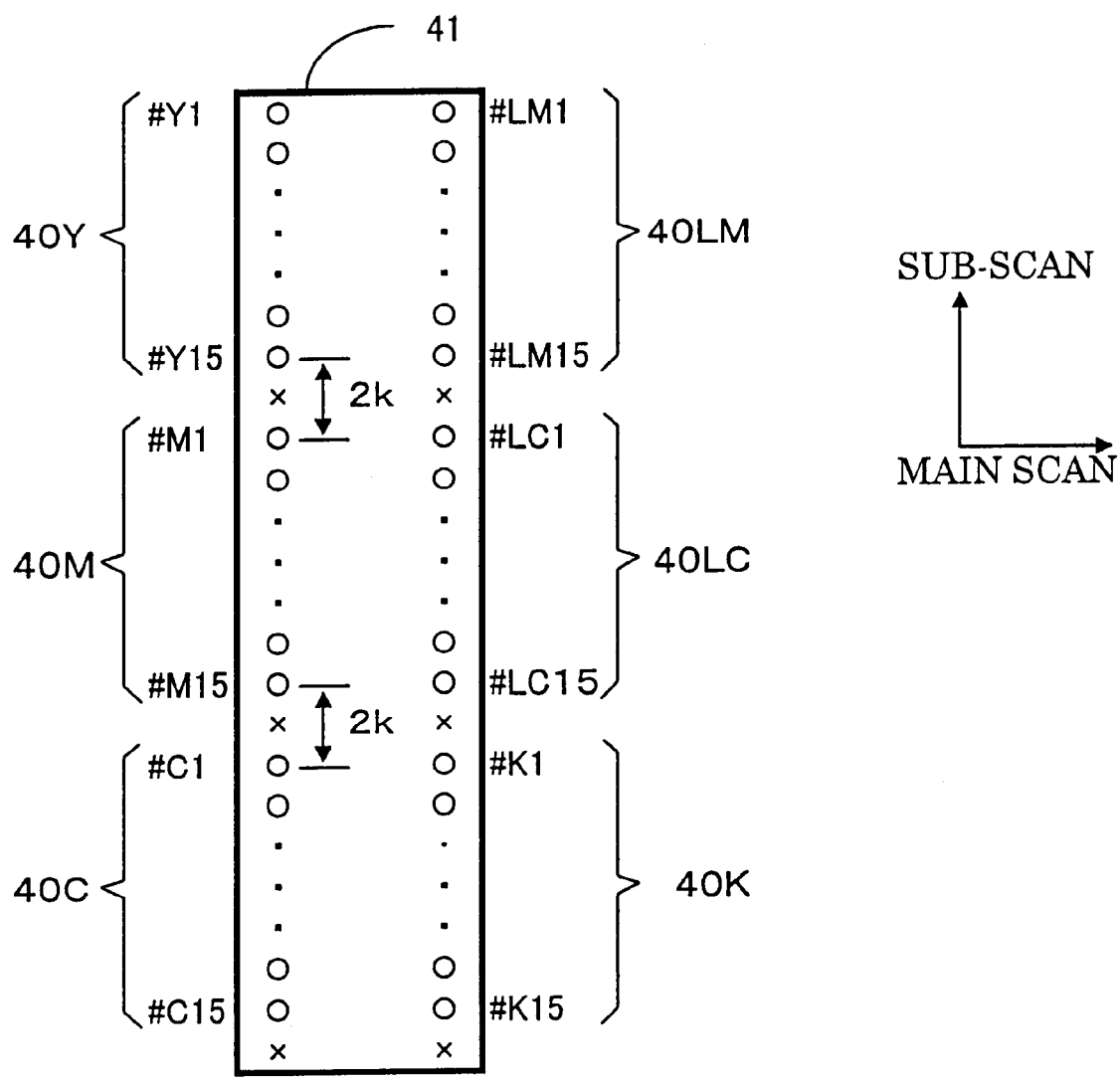
FIG. 17 shows a first actuator variation.

FIG. 17 shows a first actuator variation. In this actuator 41, the nozzle array on the left is the same as the nozzle array on the left of the actuator 40 shown in FIG. 3. The array of nozzles on the right of the actuator 41 of FIG. 17 includes a group of light magenta nozzles LM, a group of light cyan nozzles LC, and a group of black nozzles 40K. The implemented nozzle group for each ink includes 15 nozzles. The spacing between the groups of implemented nozzles for the three colors arrayed in a straight line in the sub-scanning direction is 2k.

Light magenta ink has substantially the same hue as ordinary magenta ink but a lower density. This is also the case with respect to light cyan ink. Ordinary magenta ink and cyan ink are also referred to as dark magenta ink and dark cyan ink.

Color printing using this actuator 41 of FIG. 17 can be performed using the same scanning parameters used for the actuator 40 of FIG. 3. Here, too, the accumulated error positions of the three nozzle groups 40LM, 40LC and 40 K on the right in FIG. 17 do not show much coincidence.

An advantage in using the actuator 41 of FIG. 17 is that it can use light-colored inks to thereby enable six-color printing, providing a better image quality than the actuator 40 of FIG. 3. On the other hand, the actuator 40 can use about three times more black-ink nozzles than the actuator 41, which gives the actuator 40 a high-speed monochrome printing capability.

Figure 18:
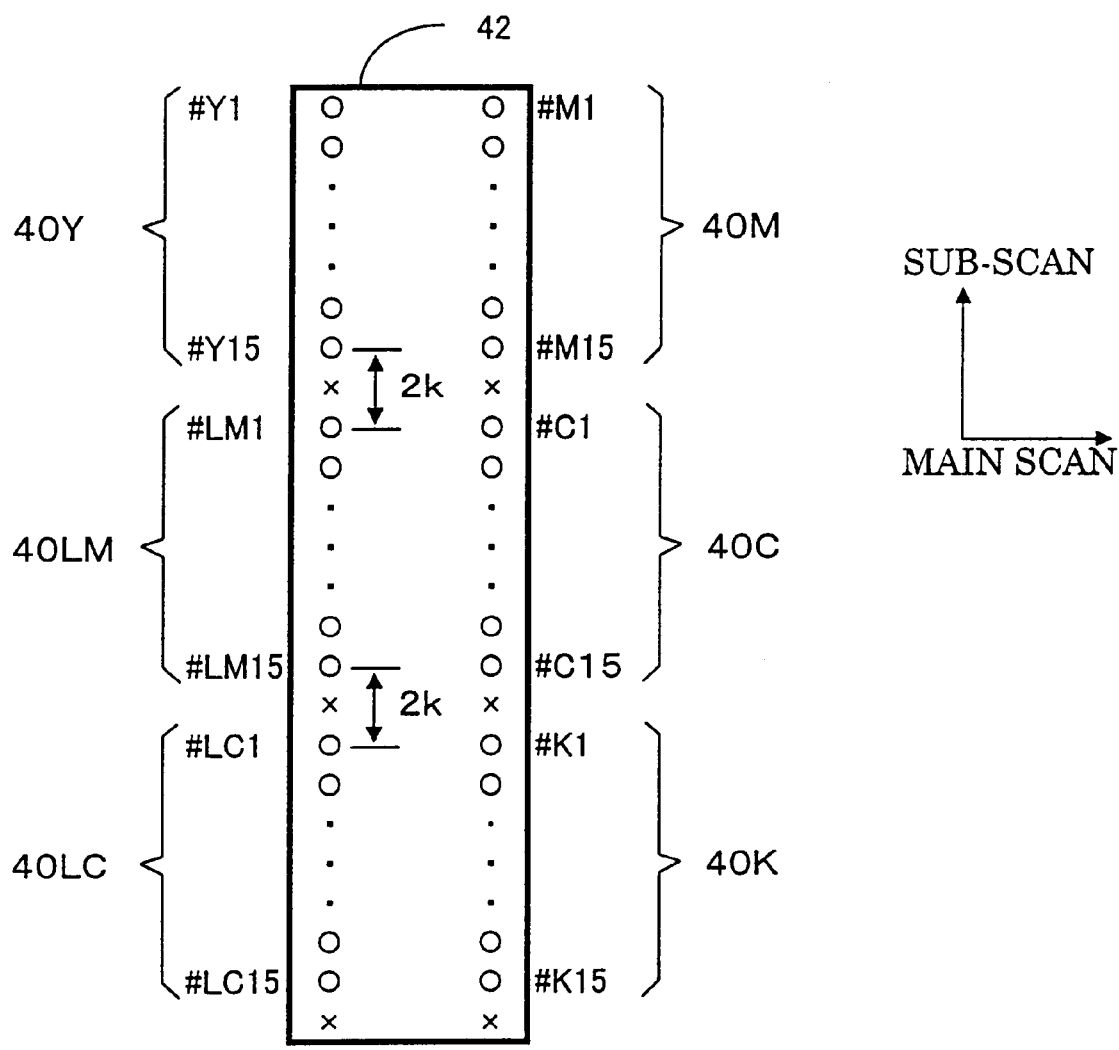
FIG. 18 shows a second actuator variation.

FIG. 18 shows a second actuator variation. The difference between this actuator 42 and the actuator 41 of FIG. 17 is that the positions of the groups of light magenta nozzles 40LM and dark magenta nozzles 40M are transposed, as are the positions of the groups of dark cyan nozzles 40C and light cyan nozzles 40LC. This actuator 42 offers substantially the same advantages as the actuator 41.

Figure 19:
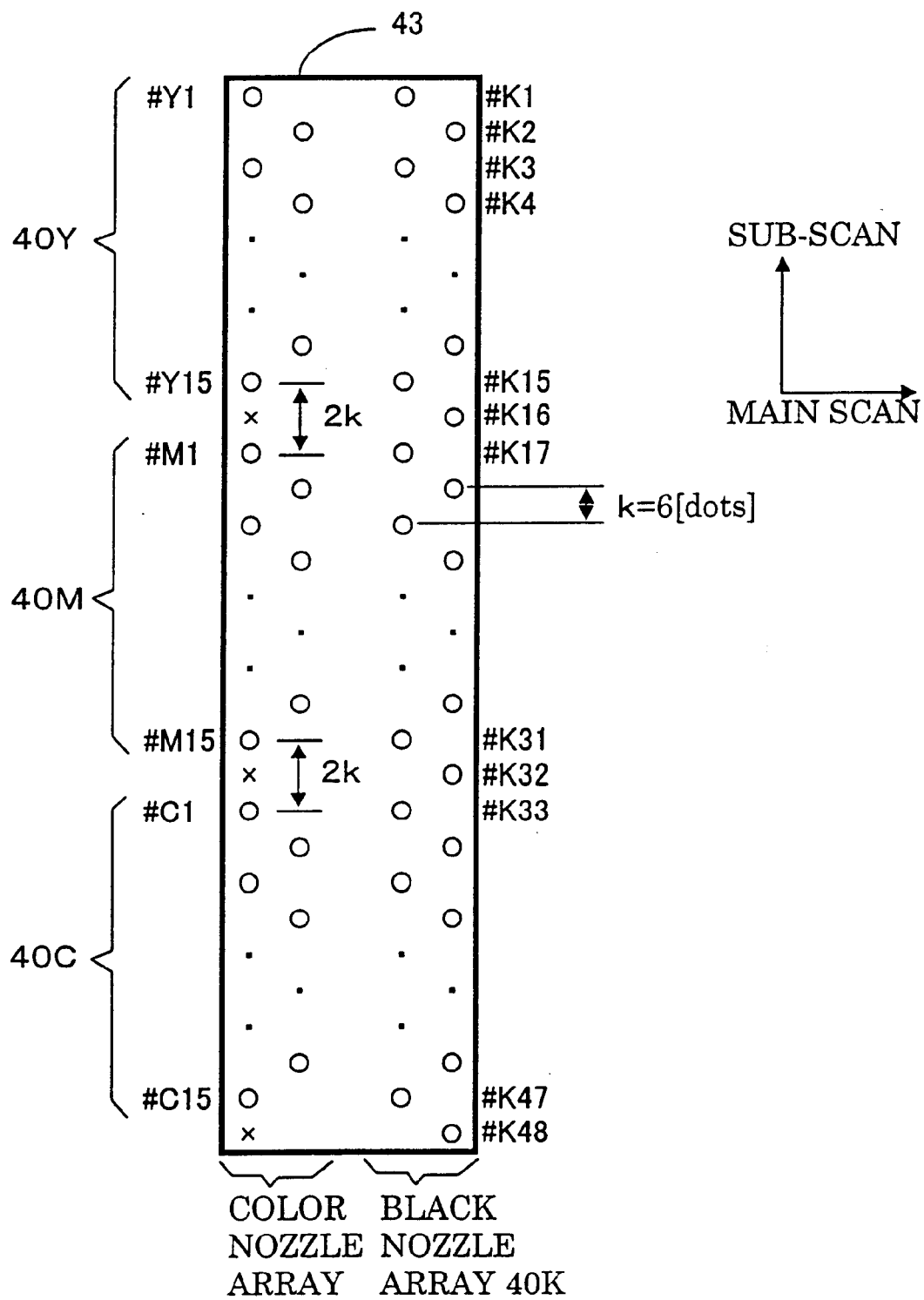
FIG. 19 shows a third actuator variation.

FIG. 19 shows a third actuator variation. In this actuator 43, the color nozzle array and black nozzle array 40K of the actuator 40 of the embodiment shown in FIG. 3 are each disposed in a zigzag arrangement, with the odd-numbered black nozzles, as one example, on the left and the even-numbered nozzles on the right. The same type of zigzag arrangement is also used for the groups of chromatic color nozzles 40Y, 40M and 40C. Even with this zigzag arrangement, the nozzles of the groups 40Y, 40M and 40C are still arrayed along a straight line in the sub-scanning direction. Thus, the description "a plurality of nozzle groups are arrayed along a straight line in the sub-scanning direction" refers to the groups of nozzles being arrayed in what is a straight line in overall terms, not that the nozzles that comprise each group are necessarily in a straight line.

While each actuator of the above embodiments and variations has nozzles for four or six colors arranged in two arrays, the nozzles may instead be arranged in a single array, or in three or more arrays. For example, with respect to the actuator shown in FIG. 3, 15 black nozzles could be provided below the groups of color nozzles, separated by a 2k gap, to thereby provide groups of nozzles for four colors, arranged in a single array.

It is also possible to use a print head in which the spacing between the groups of nozzles used for each color is set at the same value as the nozzle pitch k. For such an arrangement, printing can be effected by selecting some nozzles as non-working nozzles to set the spacing between groups of working color nozzles at M×k dots (where M is an integer of two or more).

Figure 20:
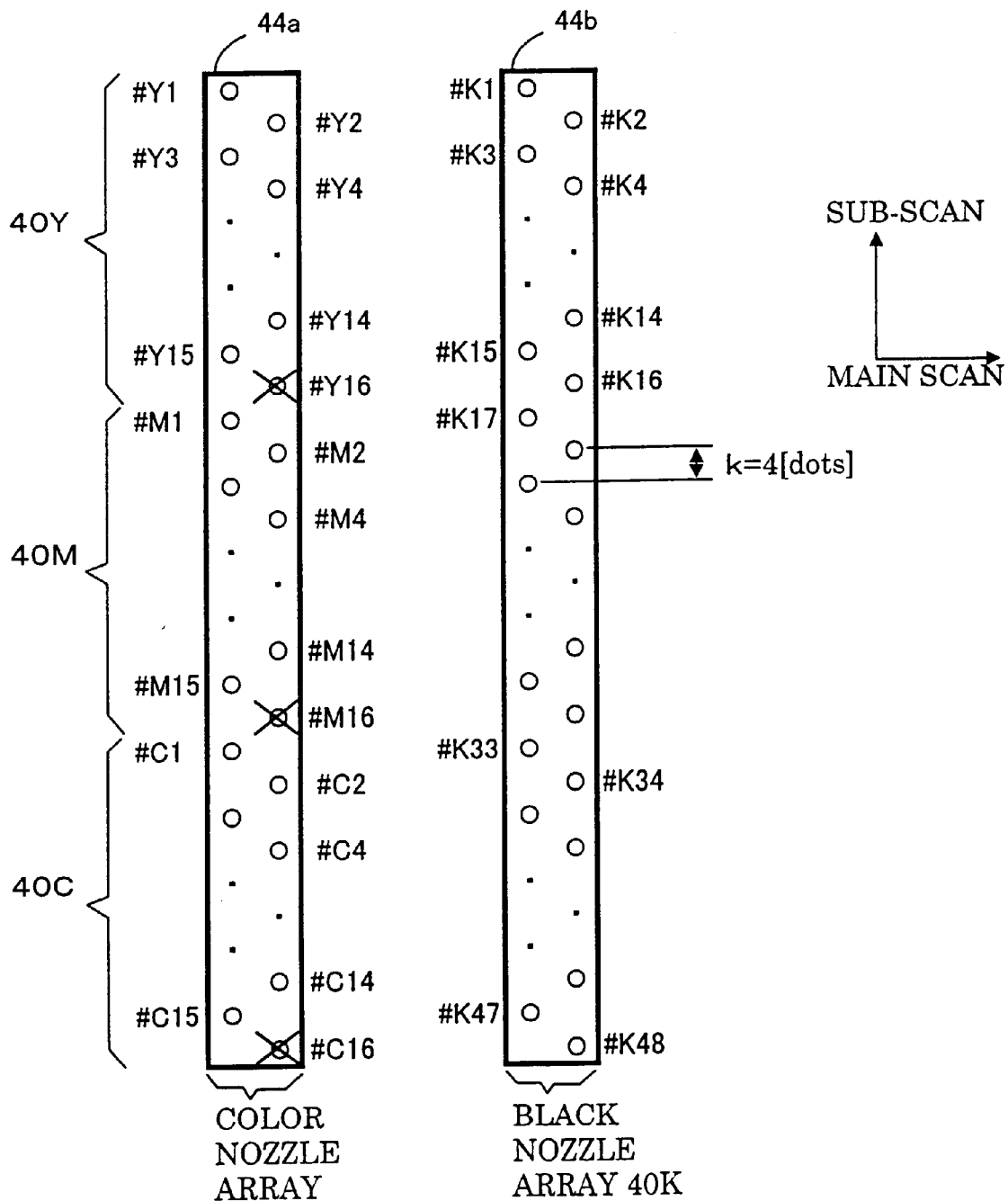
FIG. 20 shows a fourth actuator variation.

FIG. 20 shows a fourth actuator variation, comprising a first actuator 44a having just a color nozzle array and a second actuator 44b having just a black nozzle array 40K. As in FIG. 19, the nozzles are arranged in a zigzag configuration. The substantive difference from the actuator of FIG. 19 is that each color nozzle group has 16 nozzles and the spacing between the groups of color nozzles is equal to the nozzle pitch k. In the case of FIG. 20, moreover, the nozzle pitch k is set at four dots. Color printing is performed using 15 nozzles for each color, the "X" marks showing the nozzles that are not used. With respect to the black nozzle array, the 15 nozzles #K33 to #K47 are used, corresponding in position along the sub-scanning line to the working nozzles #C1 to #C15 of the cyan group. As a result, the spacing between groups is set substantially to 2k.

Figure 21:
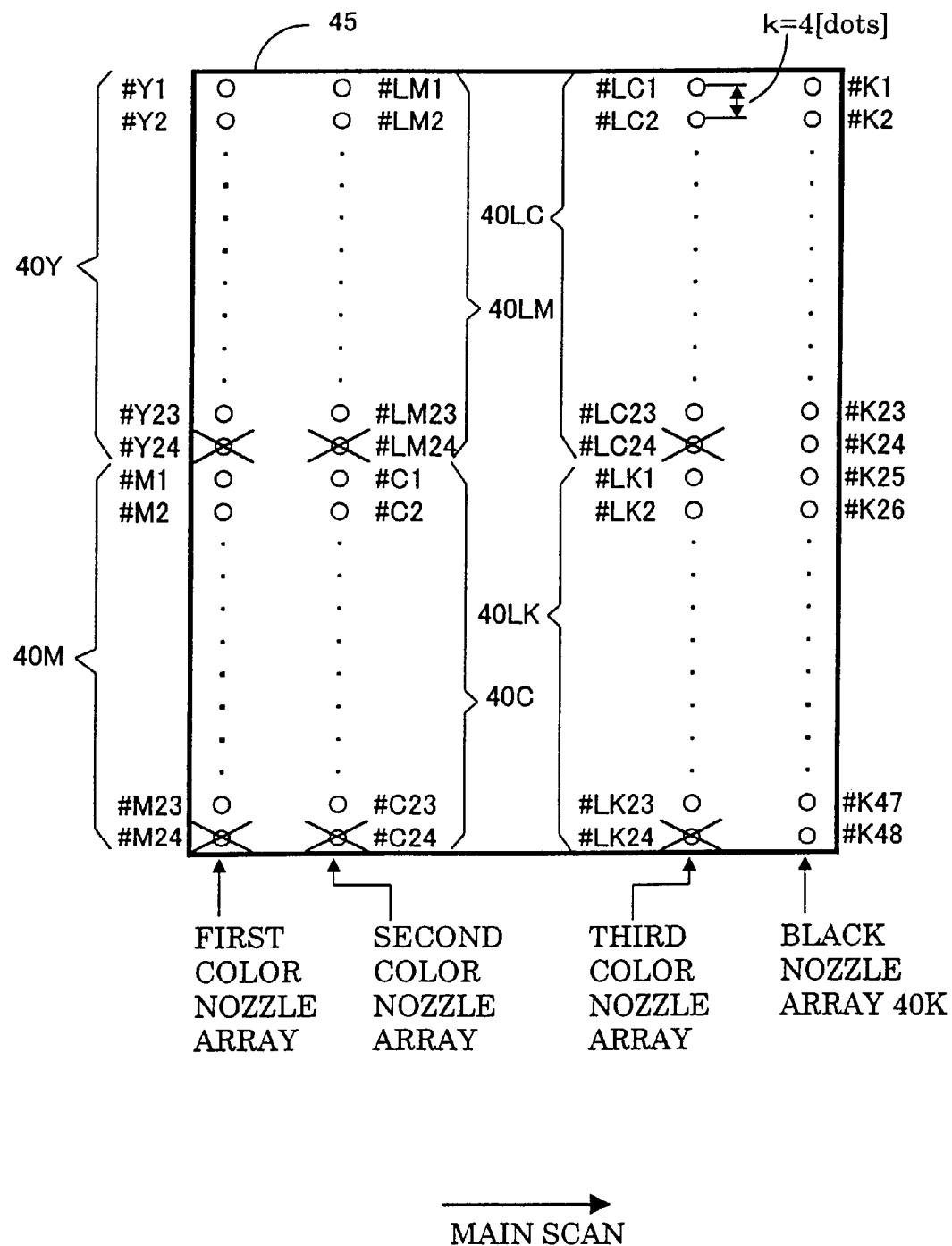
FIG. 21 shows a fifth actuator variation.

FIG. 21 shows a fifth actuator variation. The actuator 45 includes three arrays of color nozzles and one array of black nozzles. A first array of color nozzles is comprised of a group of yellow nozzles 40Y and a group of magenta nozzles 40M. A second array of color nozzles is comprised of a group of light magenta nozzles 40LM and a group of cyan nozzles 40C. A third array of color nozzles is comprised of a group of light cyan nozzles 40LC and a group of light black nozzles 40LK. The term "light black" means gray, not solid black.

The groups of nozzles are each arrayed in a straight line in the sub-scanning direction, but may be arrayed in a zigzag arrangement as in FIGS. 19 and 20. The black nozzle array 40K has 48 nozzles, and each of the other nozzle groups has 24 nozzles. Color printing is performed using 23 nozzles for each color, the "X" marks showing the nozzles that are not used. In the case of the black nozzle array, the 23 nozzles #K25 to #K47 are used, corresponding in position along the sub-scanning line to the working nozzles #LK1 to #LK15 of the light black group. As a result, the spacing between groups is set substantially to 2k.

Figure 22:
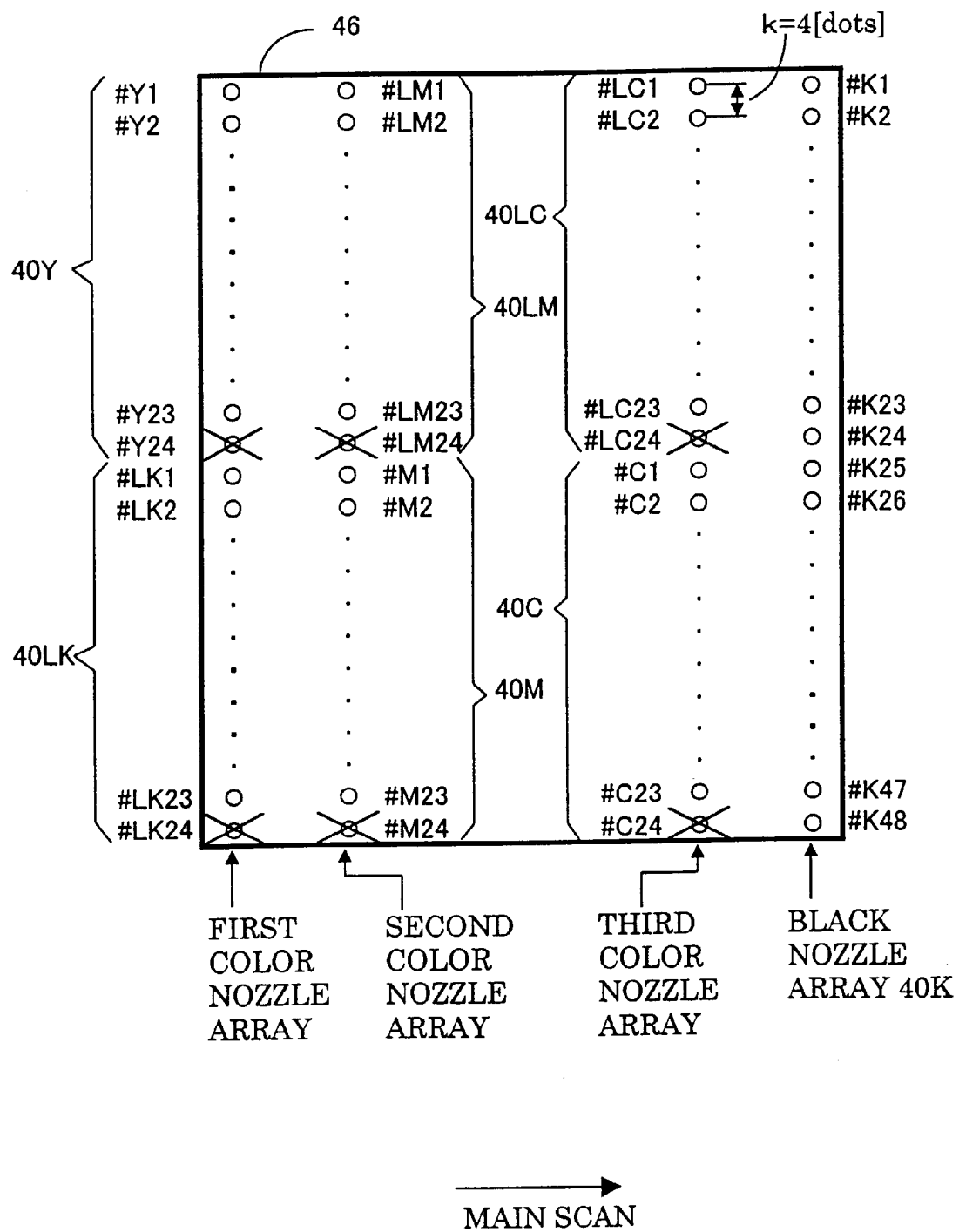
FIG. 22 shows a sixth actuator variation.

FIG. 22 shows a sixth actuator variation. The actuator 46 also includes three arrays of color nozzles and one array of black nozzles. The difference between the actuator 46 and that of FIG. 23 is the positions of the nozzle groups other than the black nozzle group 40K and the yellow nozzle group 40Y.

Figure 23:
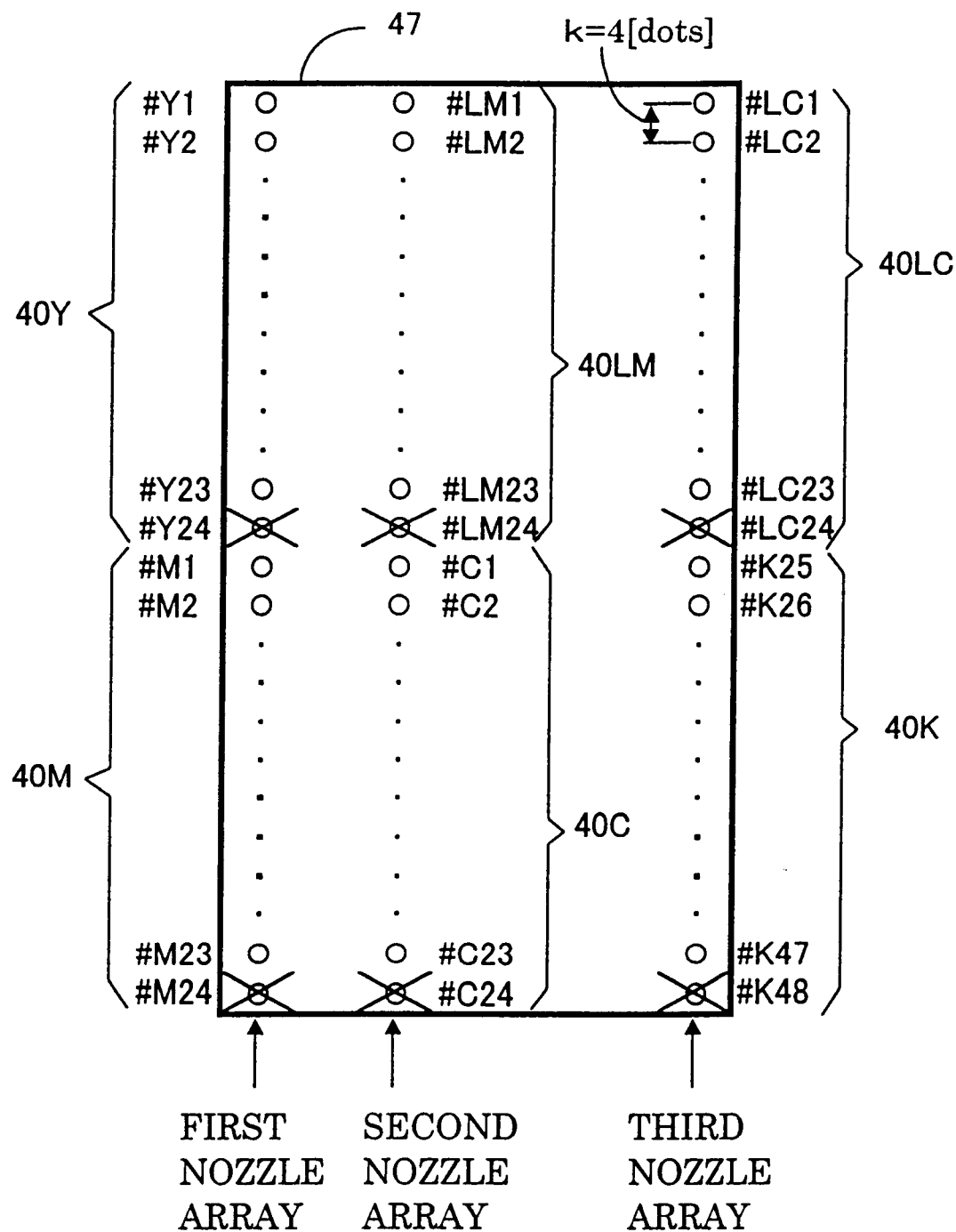
FIG. 23 shows a seventh actuator variation.

FIG. 23 shows a seventh actuator variation. This actuator 47 has three nozzle arrays. The first array is comprised of a group of yellow nozzles 40Y and a group of magenta nozzles 40M; the second array is comprised of a group of light magenta nozzles 40LM and a group of cyan nozzles 40C; and the third array is comprised of a group of light cyan nozzles 40LC and a group of black nozzles 40K. Each group has 24 nozzles. Color printing is performed using 23 nozzles for each color, the "X" marks showing the nozzles that are not used. Thus, the spacing between groups is set substantially to 2k.

Figure 24:
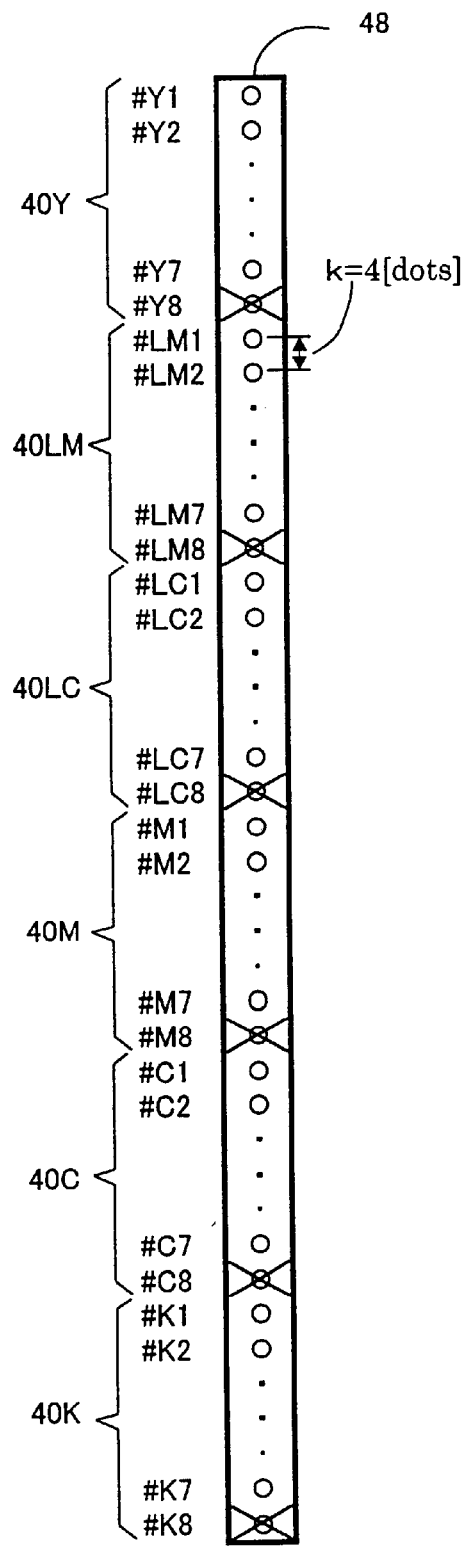
FIG. 24 shows an eighth actuator variation.
Figure 25:
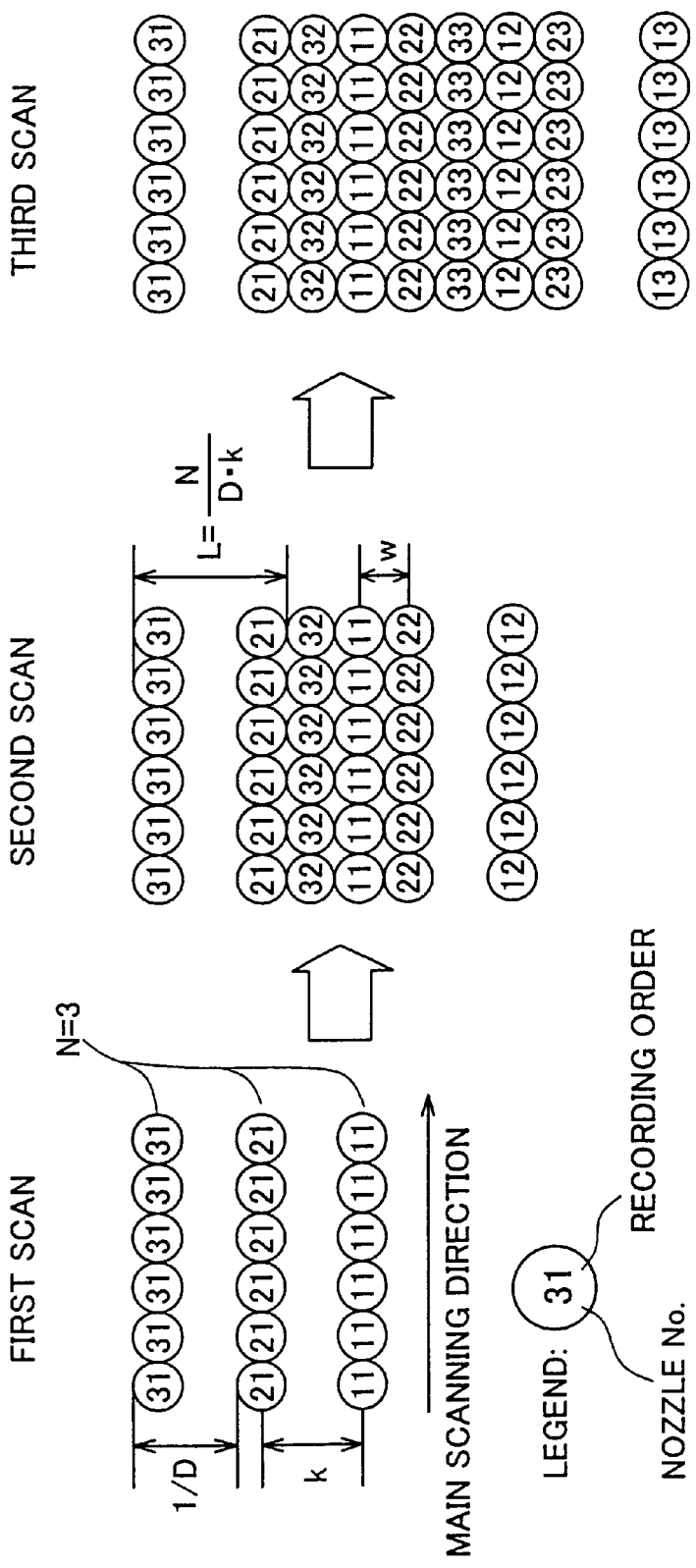
FIG. 25 shows an example of an interlaced printing scheme.
Figure 26:
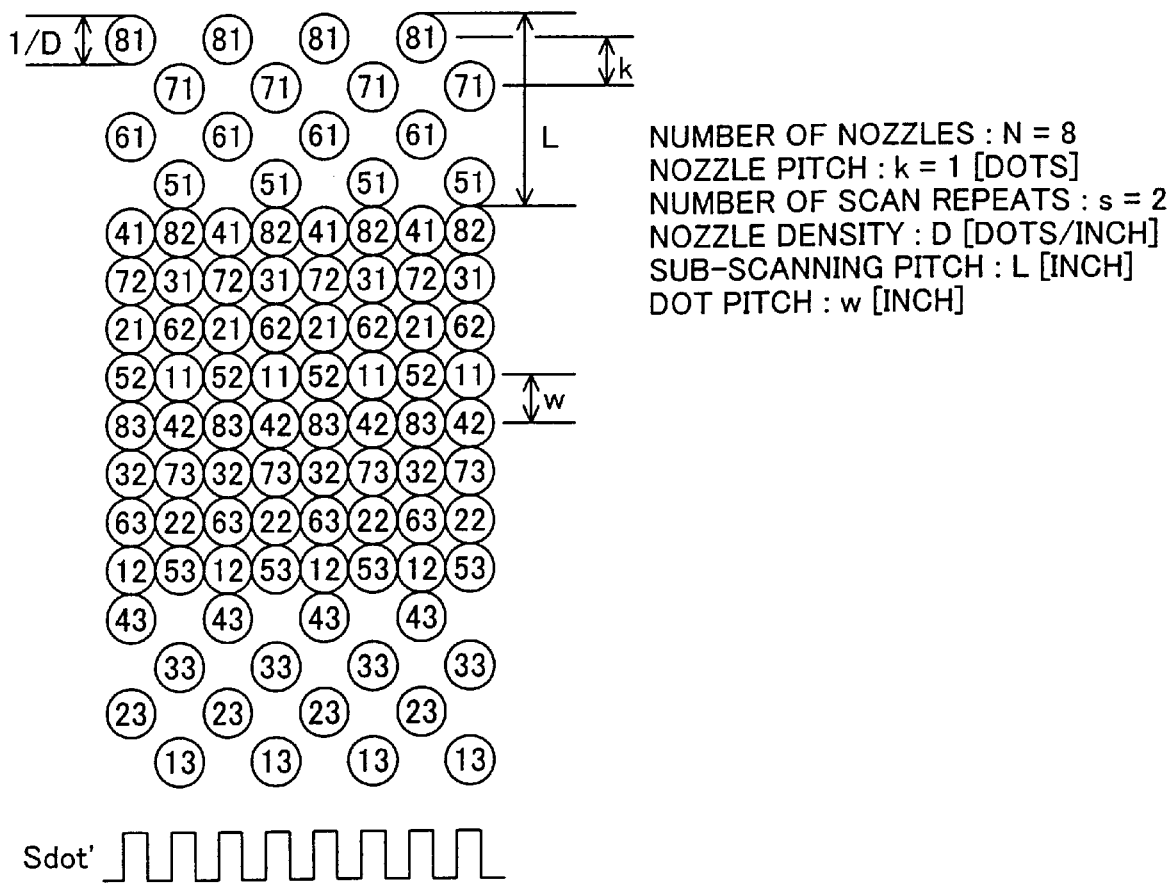
FIG. 26 shows an example of an overlapping printing scheme.

FIG. 24 shows a eighth actuator variation. This actuator 48 has a single line of nozzles arrayed in the sub-scanning direction, divided into six color groups. Each group has eight nozzles. Instead of being in a straight line, the nozzles of each group may be arranged in a zigzag configuration. Color printing is performed using 7 nozzles for each color, the "X" marks showing the nozzles that are not used. Thus, the spacing between groups is set substantially to 2k.

Although in each of the fourth to eighth actuator variations one nozzle of each group is set as a non-working nozzle, two or more nozzles may instead be set as non-working nozzles. As can be understood from the variations, even when the spacing between nozzle groups is the same as the spacing between nozzles, meaning the nozzle pitch k, the spacing between the groups of working nozzles can be set to M×k dots by suitably selecting which nozzles to set as non-working nozzles.

G. Modifications (1) The above embodiments have been explained with reference only to the cases where the number of scan repeats s is one. However, the invention can also be used in cases where s is more than one.

(2) Depending on the printer, the dot pitch (printing resolution) in the main scanning direction and the dot pitch in the sub-scanning direction can be set at different values. In such a case, parameters relating to the main scanning direction (such as the pitch of pixels on the raster lines, for example) are defined by the dot pitch in the main scanning direction, while parameters relating to the sub-scanning direction (such as nozzle pitch k and feed amount L, for example) are defined by the dot pitch in the sub-scanning direction.

(3) The invention can also be applied to drum scanning printers, in which case the direction of drum rotation becomes the main scanning direction and the direction of carriage travel the sub-scanning direction. In addition to inkjet printers, the invention can also be applied to any printing apparatus that prints on media using a print head having an array of multiple dot formation elements. By dot formation element is meant a constituent element for forming dots, such as an ink nozzle in the case of an inkjet printer. A facsimile machine and copiers are examples of such printing apparatuses.

(4) While there is provided only one actuator in the sub-scanning direction in the above embodiments and variations, a plurality of actuators may be arranged in the sub-scanning direction to construct the same configurations in the above embodiments and variations. For example, the configuration of three color nozzle groups 40Y, 40M, 40C of the first embodiment shown in FIG. 3 may be attained by three actuators arrayed in the sub-scanning direction, each including a nozzle group for one color. In this case, the black nozzle group can be formed in one actuator, or alternatively in three actuators arranged in the sub-scanning direction. Also the configuration of the eighth variation shown in FIG. 24 may be attained by six actuators arrayed in the sub-scanning direction, each including a nozzle group for one color. In this case, the nozzles marked with "X" in FIG. 24 are not formed in any of the actuators, and the nozzle groups have a spacing of 2k accordingly.

(5) While the structures of the above embodiments have been described in terms of hardware implementations thereof, the hardware may be partially replaced by software implementations. Conversely, software-based configurations may be partially replaced by hardware. For example, some of the functions of the system controller 54 (FIG. 2) may be implemented by the host computer 100.

Computer programs for realizing such functions may be provided stored on a storage medium that can be read by computer such as floppy disks and CD-ROM disks. The host computer 100 can transfer the program from the storage medium to an internal or external storage device. Alternatively, communication means may be used to send the programs to the host computer 100. To effect program functions, the stored program can be executed directly or indirectly by the host computer 100.

The host computer 100 as referred to herein is taken to include hardware and operating system, with the hardware functioning under the control of the operating system. Some of the above functions may be implemented by the operating system instead of an application program.

The storage media that can be read by computer referred to herein are not limited to portable storage media such as floppy disks and CD-ROM disks, but also includes internal storage and memory devices such as various types of RAM and ROM as well as external fixed storage such as hard disks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing apparatus that prints images by forming dots on a print medium, comprising:
   a print head that includes a plurality of dot formation elements for forming dots on the print medium;
   a main scanning drive section that drives at least one of the print head and the print medium for main scanning;
   a head drive section that during main scanning drives at least a portion of the plurality of dot formation elements to form dots;
   a sub-scanning drive section that at completion of each main scan drives at least one of the print head and the print medium for sub-scanning; and a controller for controlling each section;

wherein the print head includes a plurality of dot formation element groups for forming dots of different inks, the plurality of dot formation element groups being arrayed in a prescribed order in the sub-scanning direction, the dot formation elements of each group being arranged at an identical pitch k in the sub-scanning direction, the pitch k being set at an integer multiple value that is at least two times a pitch of dots formed on the print medium in the sub-scanning direction;

wherein the controller uses a mutually equal number N of dot formation elements of each group continuously arrayed at the pitch k to form dots on the print medium where N is an integer of at least 2, and the N dot formation elements of each group are selected so that a spacing between the groups of the N dot formation elements is M times the pitch k where M is an integer of at least 2.

2. A printing apparatus according to claim 1, wherein the print head is formed so that a spacing between end dot formation elements of adjacent groups is M times the pitch k where M is an integer of at least 2.

3. A printing apparatus according to claim 1, wherein the integer M is set at a value other than (N×n+1) where n is an arbitrary integer of at least 1.

4. A printing apparatus according to claim 1, wherein the sub-scanning is performed in accordance with an interlacing scheme where a plurality of sub-scan feeds are executed between two main scanning passes for forming dots on certain two adjacent main scanning lines.

5. A method of printing images by forming dots on a print medium, comprising the steps of:

(a) providing a print head including a plurality of dot formation element groups for forming dots of different inks, the plurality of dot formation element groups being arrayed in a prescribed order in the sub-scanning direction, the dot formation elements of each group being arranged at an identical pitch k in the sub-scanning direction, the pitch k being set at an integer multiple value that is at least two times a pitch of dots formed on the print medium in the sub-scanning direction; and (b) using a mutually equal number N of dot formation elements of each group arrayed at the pitch k to form dots on the print medium where N is an integer of at least 2;

wherein the N dot formation elements of each group are selected so that a spacing between the groups of the N dot formation elements is M times the pitch k where M is an integer of at least 2.

6. A method according to claim 5, wherein the print head is formed so that a spacing between end dot formation elements of adjacent groups is M times the pitch k where M is an integer of at least 2.

7. A method according to claim 5, wherein the integer M is set at a value other than (N×n+1) where n is an arbitrary integer of at least 1.

8. A method according to claim 5, wherein the sub-scanning is performed in accordance with an interlacing scheme where a plurality of sub-scan feeds are executed between two main scanning passes for forming dots on certain two adjacent main scanning lines.

9. A computer program product storing a computer program for causing a computer to produce print data to be supplied to a printer having a print head, the computer program product comprising:

a computer readable medium; and a computer program stored on the computer readable medium;

wherein the print head includes a plurality of dot formation element groups for forming dots of different inks, the plurality of dot formation element groups being arrayed in a prescribed order in the sub-scanning direction, the dot formation elements of each group being arranged at an identical pitch k in the sub-scanning direction, the pitch k being set at an integer multiple value that is at least two times a pitch of dots formed on the print medium in the sub-scanning direction; and wherein the computer program causes a computer to produce the print data, the print data being arranged to cause the printer to form dots on the print medium using a mutually equal number N of dot formation elements of each group continuously arrayed at the pitch k where N is an integer of at least 2, the N dot formation elements of each group being selected so that a spacing between the groups of the N dot formation elements is M times the pitch k where M is an integer of at least 2.

10. A computer program product according to claim 9, wherein the print head is formed so that a spacing between end dot formation elements of adjacent groups is M times the pitch k where M is an integer of at least 2.

11. A computer program product according to claim 9, wherein the integer M is set at a value other than (N×n+1) where n is an arbitrary integer of at least 1.

12. A computer program product according to claim 9, wherein the sub-scanning is performed in accordance with an interlacing scheme where a plurality of sub-scan feeds are executed between two main scanning passes for forming dots on certain two adjacent main scanning lines.

13. A printing means that prints images by forming dots on a print medium, comprising:

means for forming dots on the print medium that includes a plurality of dot formation elements;

means for main scanning that drives at least one of the means for forming dots and the print medium;

means for driving that during main scanning drives at least a portion of the plurality of dot formation elements;

means for sub-scanning that at completion of each main scan drives at least one of the means for forming dots and the print medium; and means for controlling the printing means;

wherein the means for forming dots includes a plurality of dot formation element groups for forming dots of different inks, the plurality of dot formation element groups being arrayed in a prescribed order in a sub-scanning direction, the dot formation elements of each group being arranged at an identical pitch k in the sub-scanning direction, the pitch k being set at an integer multiple value that is at least two times a pitch of dots formed on the print medium in the sub-scanning direction;

wherein the means for controlling uses a mutually equal number N of dot formation elements of each group continuously arrayed at the pitch k to form dots on the print medium where N is an integer of at least 2, and the N dot formation elements of each group are selected so that a spacing between the groups of the N dot formation elements is M times the pitch k where M is an integer of at least 2.

14. The printing means according to claim 13, wherein the means for forming dots is formed so that a spacing between end dot formation elements of adjacent groups is M times the pitch k where M is an integer of at least 2.

15. The printing means according to claim 13, wherein the integer M is set at a value other than (N×n+1) where n is an arbitrary integer of at least 1.

16. The printing means according to claim 13, wherein sub-scanning is performed in accordance with an interlacing scheme where a plurality of sub-scan feeds are executed between two main scanning passes for forming dots on certain two adjacent main scanning lines.

* * * * *